United States Patent
Oh et al.

(10) Patent No.: US 8,451,913 B2
(45) Date of Patent: May 28, 2013

(54) FREQUENCY RESPONSIVE BUS CODING

(75) Inventors: Kyung Suk Oh, Cupertino, CA (US);
John Wilson, Raleigh, NC (US);
Joong-Ho Kim, San Jose, CA (US);
Jihong Ren, Sunnyvale, CA (US)

(73) Assignee: Rambus Inc., Sunnyvale, CA (US)

( * ) Notice: Subject to any disclaimer, the term of this patent is extended or adjusted under 35 U.S.C. 154(b) by 4 days.

(21) Appl. No.: 12/971,213

(22) Filed: Dec. 17, 2010

(65) Prior Publication Data
US 2011/0084737 A1    Apr. 14, 2011

Related U.S. Application Data

(63) Continuation of application No. PCT/US2009/066253, filed on Dec. 1, 2009, which is a continuation-in-part of application No. PCT/US2009/003697, filed on Jun. 18, 2009.

(60) Provisional application No. 61/132,585, filed on Jun. 20, 2008.

(51) Int. Cl.
*H04B 3/00* (2006.01)
*H04L 25/00* (2006.01)

(52) U.S. Cl.
USPC ........................................ 375/257

(58) Field of Classification Search
USPC .......... 375/288, 257, 260, 377, 242; 710/100, 710/107, 305; 326/62, 82, 90; 370/359, 365; 327/100, 108; 333/132; 341/50–51
See application file for complete search history.

(56) References Cited

U.S. PATENT DOCUMENTS

| | | | |
|---|---|---|---|
| 4,215,245 A | 7/1980 | Bellisio | 370/84 |
| 4,620,311 A * | 10/1986 | Schouhamer Immink | 375/292 |
| 5,025,256 A * | 6/1991 | Stevens | 341/59 |
| 5,278,902 A * | 1/1994 | Nugent | 380/42 |
| 6,160,423 A * | 12/2000 | Haq | 327/41 |
| 6,577,684 B1 * | 6/2003 | Hirano et al. | 375/286 |
| 6,661,355 B2 * | 12/2003 | Cornelius et al. | 341/58 |
| 6,700,510 B1 * | 3/2004 | Kryzak et al. | 341/59 |
| 6,844,833 B2 * | 1/2005 | Cornelius et al. | 341/58 |
| 6,927,709 B2 * | 8/2005 | Kiehl | 341/102 |
| 7,307,554 B2 * | 12/2007 | Kojima | 341/58 |
| 7,447,929 B2 | 11/2008 | McCall et al. | 713/323 |
| 7,522,073 B1 | 4/2009 | Kao | 341/55 |

(Continued)

OTHER PUBLICATIONS

Stan, Mircea R, "Bus-Invert Coding for low power I/O," IEEE Transactions on Very Large Scale Integration (VLSI) Systems, vol. XX, No. Y, 1999, pp. 100-108.

(Continued)

*Primary Examiner* — Jean B Corrielus
(74) *Attorney, Agent, or Firm* — The Neudeck Law Firm, LLC

(57) ABSTRACT

A data system permits bus encoding based on frequency of the bus and the frequency of switching on the bus so as to avoid undesirable frequency conditions such as a resonant condition or interference with other electrical devices. Transmission frequencies along one or more busses are monitored and used to control the encoding process, for example, an encoding process based on data bus inversion (DBI). The use of both a measure of an absolute number of logic levels ("DBI_DC") and a measure of a number of logic level transitions relative to a prior signal ("DBI_AC") provides a measure of control that may be used to compensate for both main and predriver switching noise.

43 Claims, 26 Drawing Sheets

U.S. PATENT DOCUMENTS

| | | | | |
|---|---|---|---|---|
| 7,616,133 | B2* | 11/2009 | Hollis | 341/58 |
| 7,899,961 | B2* | 3/2011 | Kao | 710/100 |
| 2004/0124715 | A1 | 7/2004 | Huang et al. | 307/127 |
| 2007/0074055 | A1 | 3/2007 | McCall et al. | 713/300 |
| 2007/0115733 | A1 | 5/2007 | Jang et al. | 365/189.07 |

OTHER PUBLICATIONS

Stan, Mircea and Burleson, W.P., "Coding a Terminated Bus for Low Power", Great Lakes Symposium on VLSI, pp. 70-73, Mar. 1995.

Nakamura et al., "A 50% Noise Reduction Interface Using Low-Weight Coding", 1996 Symposium on VLSI circuits Digest of Technical Papers, pp. 144-145.

Stan et al., "Bus-Invert Coding for low-Power I/O" IEEE Transactions on very large Scale Integration (VLSI) systems, vol. 3, No. 1, Mar. 1995. pp. 49-58. 10 pages.

Liu, Hui, et al., "Pre-Driver PDN SSN, OPD, Data Encoding, and Their Impact on SSJ." Electronic Components and Technology Conference dated May 26, 2009. pp. 1127-1131.

Drabkin, Victor et al. "Aperiodic Resonant Excitation of Microprocessor Power Distribution Systems and the Reverse Pulse Technique," Proceedings of Electrical Performance of Electronic Packaging conference, 2002, pp. 175-178 downloaded on Aug. 9, 2009. 4 pages.

Schmitt, R. et al., "Power Integrity Analysis of DDR2 Memory Systems During Simultaneous Switching Events," DesignCon 2006, Santa Clara, California, Feb. 6-9, 2006.

International Search Report and the Written Opinion with mail date of Jun. 14, 2010 re International Application No. PCT/US2009/003697. 17 Pages.

International Search Report and Written Opinion with mail date of Jul. 20, 2010 for International Application No. PCT/US2009/066253. 9 pages.

Article 34 Amendment, Reply to Written Opinion, dated Sep. 9, 2010 in International Application No. PCT/US2009/003697. 2 pages.

International Preliminary Report (Chapter II) with mailing date of Feb. 4, 2011 re Int'l. Application No. PCT/US09/03697. 7 Pages.

EP Official Communication dated Jun. 6, 2011 re EP Application No. 09767110.1. 8 Pages.

EP Response dated Oct. 14, 2011 to the Official Communication dated Jun. 6, 2011 re EP Application No. 09767110.1. 30 Pages.

International Preliminary Report on Patentability (Chapter II) dated Mar. 22, 2012 re Int'l Application No. PCT/US09/66253. 8 pages.

\* cited by examiner

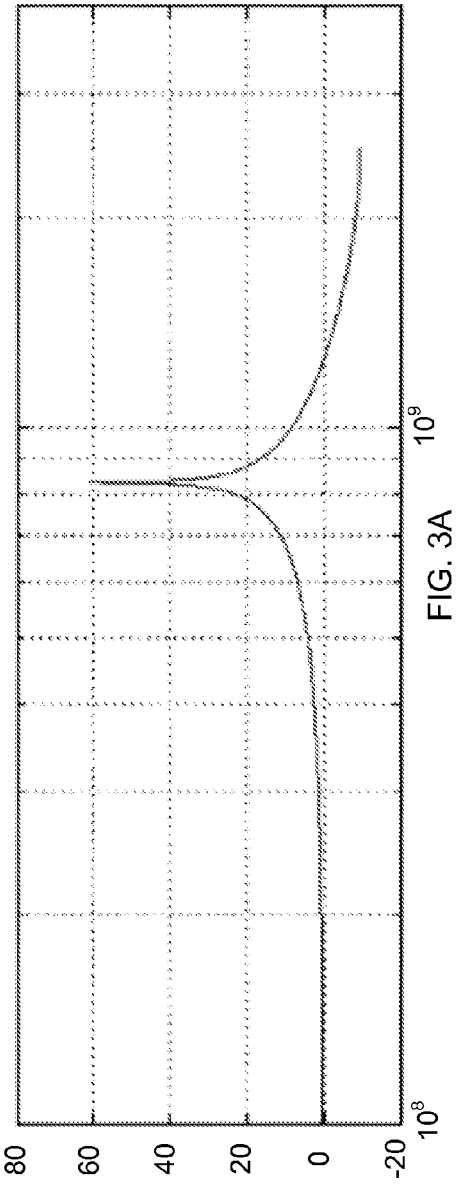
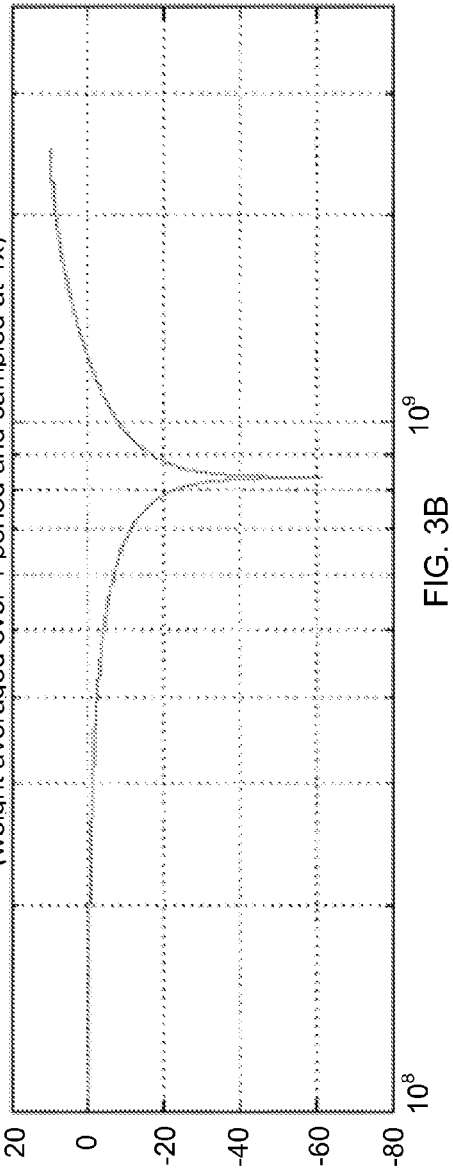

Example of PDN impedance with multiple resonance peaks in the frequency domain (optional)

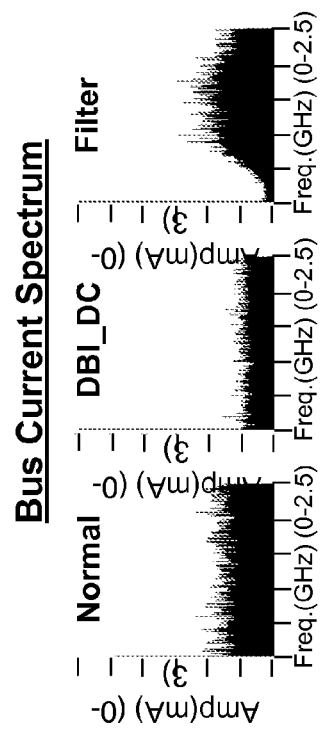
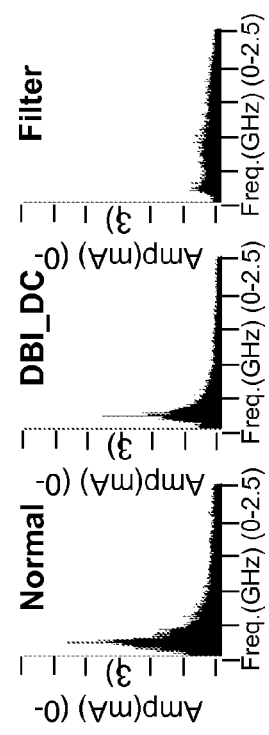
FIG. 12B
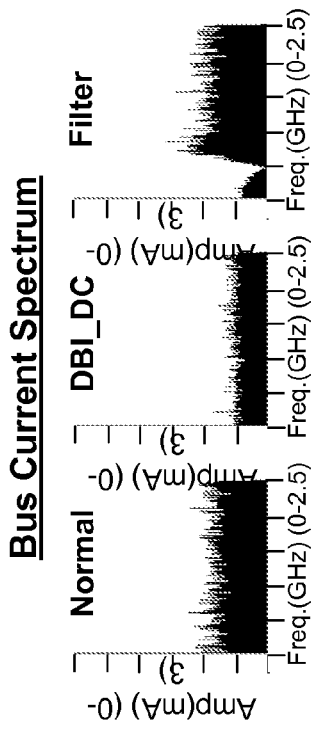
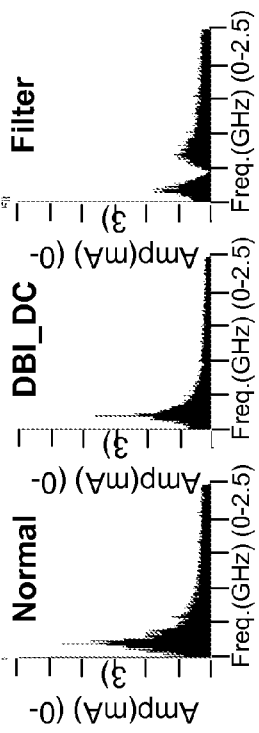
FIG. 12A

FREQUENCY RESPONSIVE BUS CODING

CROSS-REFERENCE TO RELATED APPLICATIONS

The present application claims the benefit of, and is a continuation of international application number PCT/US2009/066253, entitled FREQUENCY RESPONSIVE BUS CODING, filed Dec. 1, 2009, which claims the benefit of, and is a continuation-in-part of, international application number PCT/US2009/003697, entitled FREQUENCY RESPONSIVE BUS CODING, filed Jun. 18, 2009, which is hereby incorporated herein by reference for all purposes, which claims the benefit of U.S. Provisional Application Ser. No. 61/132,585, filed Jun. 20, 2008, entitled FREQUENCY RESPONSIVE BUS CODING, which is hereby incorporated herein by reference for all purposes.

BACKGROUND

Computing, communications, consumer electronics and other processor-based or digital systems are driven to host a larger number of applications, each with increasing complexity. The transfer of information and signals required among the components of such systems leads to increasing demands on the devices involved in the transfer of data. Indeed, the configuration and characteristics of the power delivery network ("PDN") involved in driving and/or receiving bus transmissions can have consequences on overall performance of the data system. For example, the impedance of a power delivery network is often characterized by frequency response issues, such as a strong resonance. In some systems, a strong resonance can occur in a frequency range from about 100-300 MHz, depending on the system characteristics. These frequency response issues can degrade the quality of supply voltage of the system, affect voltage and timing margins, and otherwise engender data dependent delay, gain reduction in amplifiers, and/or bit errors in samplers. Other bus frequency-related issues can also cause problems. For example, it is well known that even wired electronic devices can exhibit radio frequency characteristics which are undesirable because they interfere with, or are interfered with by, other devices.

BRIEF DESCRIPTION OF THE DRAWINGS

The present technology is illustrated by way of example, and not by way of limitation, in the figures of the accompanying drawings, in which like reference numerals refer to similar elements including:

FIG. 3A is a graph illustrating a frequency response of an example filter that may be implemented with a detector;

FIG. 3B is a graph illustrating an inverse frequency response of an example filter that may be implemented with a detector;

FIG. 12A illustrates a bus spectrum analysis comparing simulations of a bus having encoded and non-encoded technologies;

FIG. 12B illustrates a bus spectrum analysis comparing simulations of a bus having encoded and non-encoded technologies;

DETAILED DESCRIPTION

In an embodiment, the number lines of a bus that are driven to a given state each bus cycle are input to a frequency responsive filter. This input is a time varying representation of the power draw on the bus driving power distribution network. The number of lines of a bus that toggle from bus state to bus state is also input to a frequency responsive filter. This input is a time varying representation of the power draw on the power distribution network feeding the predrivers of the bus drivers. These filters have frequency responses that, for example, have peaks that correspond to resonant frequencies of the bus power distribution network and/or the predriver power distribution network, respectively.

When the time varying power draw on a power distribution network has a strong frequency component corresponding to a resonant frequency of a power distribution network (or other undesirable condition), the output of the corresponding filter will rise above a threshold. In response to this, the system may change the encoding on the bus to disrupt this resonance. By disrupting the excitation of a power distribution network resonant response, the peak voltage, current, and/or phase excursions on the power distribution networks are reduced. By reducing these excursions, inter-symbol interference, noise, and jitter on the bus, and the performance of other circuitry may be improved. In addition, reducing noise at particular frequencies or resonances on the power distribution networks may reduce interference with, or by, other nearby electronic devices.

Figure 1A:
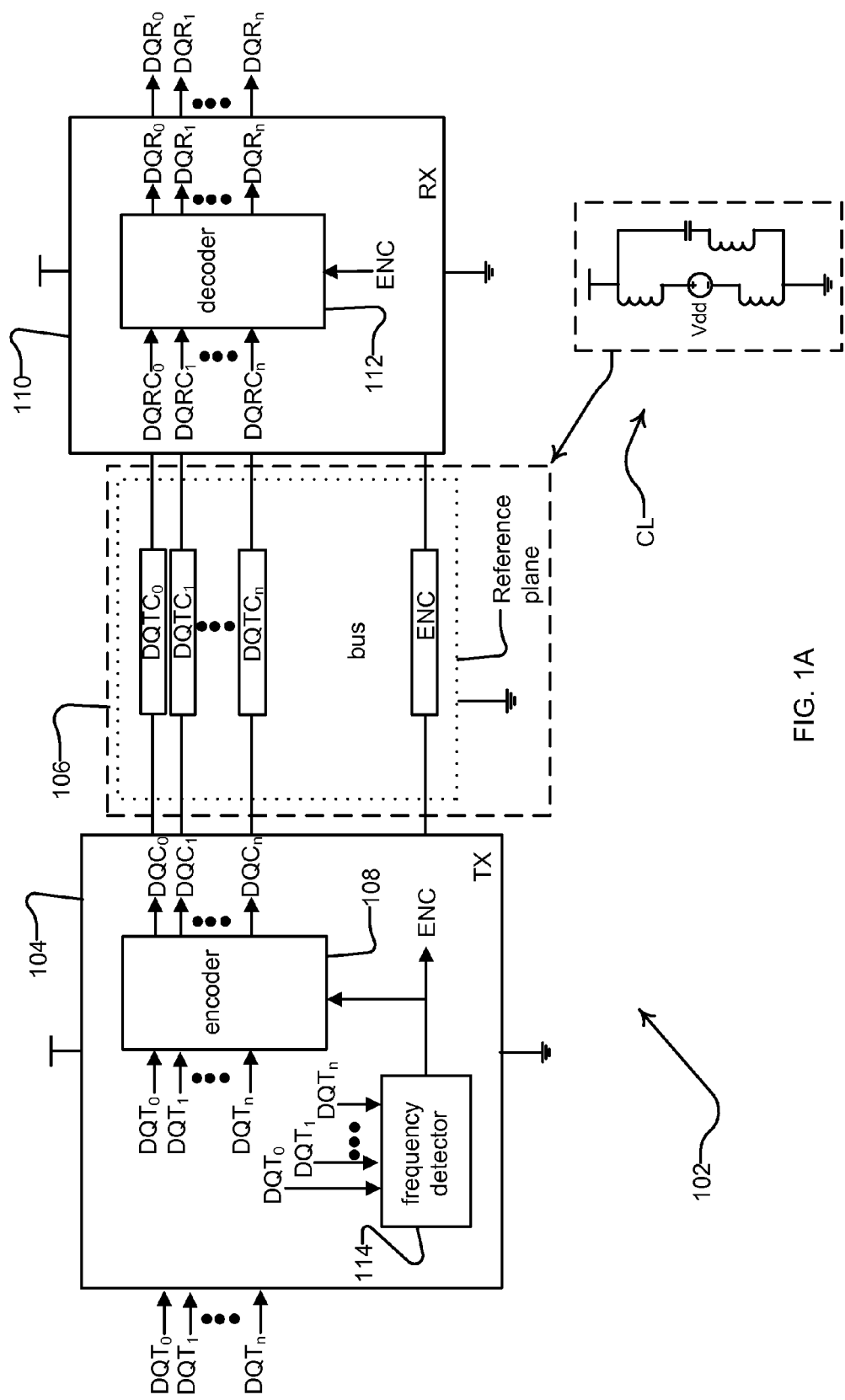
FIG. 1A is a block diagram illustrating example elements of an embodiment of a data system that is suitable for implementing frequency-based bus coding technology.

A data system 102, such as the frequency-based bus coding system according to one embodiment of the present technology, is illustrated in FIG. 1A. The components of data system 102 control data transmissions on the bus by monitoring a frequency content of the bus to detect one or more frequencies. These detected frequencies may be ones that can lead to, or be suggestive of, a potential for system performance degradation. The detected frequencies can be signals that are actively transmitted by one or more components and, if desired, may include signals passively transmitted (e.g., accounting for bus idle time, high-impedance state, return, or other communications transmitted on the bus). Upon detection of a particular frequency, frequencies, or range(s) of frequencies, data system 102 alters the encoding scheme used for transmitting data onto the bus in order to achieve specific frequency-related goals. For example, in one implementation, the frequency-based bus coding system may detect a resonant frequency condition associated with the data on the bus 106. In a second implementation, the frequency-based bus encoding system may avoid specific frequencies, (e.g., to avoid interference with, or by, other nearby electronic devices, or to achieve other frequency-related goals). In response, the frequency-based bus coding system may selectively encode some or all lines of at least one data bus. In yet another implementation, frequency-related goals may be dynamic, e.g., selectively turned "on" or "off" or actively changed depending upon environment (e.g., to implement an "airplane mode"), with mode selection being made automatic if desired.

FIG. 1A illustrates an embodiment that may be used to address resonance-related issues. For example, in a system configured for single-ended signaling, the aggregate induced current associated with the transient data of numerous channels can excite a resonance of the system and reduce the performance of the entire system. This simultaneous switching noise may result from numerous output drivers of one or more busses switching at approximately the same time. This can produce wide-band energy that degrades the quality of the supply voltage of the system. When power supply noise couples to an input signal node and reference node in unequal amounts, the difference results in a net transfer of noise from the power supply to the input signal. This net noise degrades the voltage and timing margin of the system. In addition, if the noise is large enough, it may cause circuits operating from the infected PDN to be pushed outside of their normal operating region. It may cause, for example, data dependent delay, gain reduction in amplifiers, and/or bit errors in samplers.

To mitigate these issues, as illustrated in the embodiment of FIG. 1A, typical components of a frequency-based bus coding system may include a transmitter 104, a bus 106, a receiver 110, an encoder 108, a decoder 112 and at least one frequency detector 114. FIG. 1A also illustrates a simplified equivalent circuit model CL. The model CL represents an example power delivery network associated with bus 106. The illustrated model includes inductance of the power and the ground return path. It also includes decoupling capacitance with a finite series inductance. For simplicity purposes, resistances have been omitted.

As depicted in FIG. 1A, the data system 102 includes detector 114. Detector 114 may be a frequency detector. Detector 114 may be implemented to detect, or predict, energy related characteristics associated with the channels and/or signal lines of bus 106. Detector 114 produces an encoding control signal (ENC) that controls the setting of a state of the coding scheme of encoder 108 and/or decoder 112. Detector 114 may be implemented to make a spectrum-based or frequency-based decision for controlling encoding of data to be transmitted on bus 106. Depending on the frequency response(s) of detector 114, the decisions may be implemented to reduce or avoid an energy characteristic of bus 106 under certain transmission conditions. These conditions may allow for spectrum smoothing or shaping around a particular frequency.

Detector 114 may be implemented to control encoding as a function of an aggregate current of some or all of the lines of bus 106. The encoding, or change in encoding, may change the current so that its spectral content is low in energy at or around a chosen frequency, such as a resonant frequency, that may be associated with an undesirable or increased noise condition of the power delivery network of the system. In some embodiments, encoding of the data might also be used to reduce spectral energy in more than one band of frequencies. However, such frequency-based bus encoding may also be implemented to make encoding decisions that do not reduce peak energy or noise characteristics.

Detector 114 may evaluate two or more unit intervals, such as successive unit intervals, of the data of the data signals to be transmitted (e.g., $DQT_0, DQT_1 \ldots DQT_n$) that are associated with some or all of the data lines of bus 106. Optionally, the evaluation may also include other or all signal lines of the bus such as the line(s) indicating bus encoding (e.g., ENC), a masking signal line, control lines of any control or addressing signals, etc. The evaluation may predict a potential undesired frequency situation with the potential aggregate energy, or current, of bus 106, or a PDN, and make an encoding decision to avoid or reduce an undesirable or detrimental energy situation. Such a frequency-based predictive encoding decision may thus be utilized to avoid problems that may be harmful to, or otherwise degrade, the overall system performance. Such problems may include: resonance of the power delivery network induced by switching bus outputs; peak switching noise at the resonance of frequency of the power delivery network; and, noise injection to other circuits that have specific frequency sensitivities, such as phase locked loops (PLLs), delay locked loops (DLLs), filters, clock buffers, etc.

By determining a particular resonant frequency based on the impedance of the power delivery network and/or return path, and by configuring detector 114 to respond at or about that frequency, an encoding scheme may be controlled to avoid less desired operating conditions for the power delivery network. Detector 114 may be implemented with one or more filters, such as with analog (e.g., continuous-time), and/or digital filters, that have a particular frequency response. Detector 114 may then generate an encoding control signal for setting encoder 108 and/or decoder 112 based on the particular frequency response. This frequency response may correspond to a frequency characteristic that causes undesirable operating conditions for the power delivery network.

In some embodiments, the filter may be implemented as one or more band-stop and/or one or more bandpass filter(s) depending on the system configuration and desired frequency response. Optionally, high-pass and/or low-pass filters may also be implemented. Some embodiments may even be based on finite impulse response (FIR) and/or infinite impulse response (IIR) filters. Moreover, some implementations may use switched-capacitor filters, or a mixed-mode filtering system. A mixed-mode filtering system may convert an aggregate predicted current into an analog signal and use current mixing circuits in the frequency-based determination. This information may be converted back to a digital encoding control signal. Techniques such as delta-sigma modulation may also be implemented in such a detector for the conversion.

Data system 102 may also include at least one transmitter 104. Transmitter 104 typically transmits data onto the lines or signal paths of bus 106. The transmitter may include a plurality of signal drivers (not shown in FIG. 1A). Each signal driver may transmit a data signal on a path or channel (e.g., a line) of bus 106. Transmission of data will typically be regulated by one or more transmit clock signals to permit the drivers to each transmit data within a common data interval, or unit interval, of the data signal. Each signal path of bus 106 may be a single ended signal path or signal line. Although not shown in FIG. 1A, it should be understood that data system 102 may employ other elements for data transmission on bus 106 such as transmit equalizers, receiver equalizers, and clock generation circuit elements. Clock generation circuit elements may include, for example, oscillators, phase lock loops, delay lock loops, phase mixers, etc.

Transmitter 104 will typically include encoder 108. Encoder 108 is configured to selectively modify or encode the data to be transmitted (e.g., $DQT_0, DQT_1 \ldots DQT_n$). This permits transmitter 104 to transmit encoded data signals (e.g., $DQC_0, DQC_1 \ldots DQC_n$). Encoding the data to be transmitted into encoded data signals for bus 106 can, in some embodiments, improve an energy characteristic of the transmission of the data on bus 106, or a PDN, by decreasing the demands on the PDN. Thus, encoding may be implemented to reduce any or all of the current, voltage or power, etc. required to transmit the data on the bus. For example, in some situations, transmitting encoded data signals may involve less noise and/or less power than transmitting the data signals to be transmitted without encoding.

The circuits of encoder 108 may be implemented with an inverter in a data bus inversion circuit to implement a data bus inversion coding scheme, such as a toggle, flag, or polarity bit inversion scheme. In such an embodiment, data of data signals to be transmitted (e.g., $DQT_0, DQT_1 \ldots DQT_n$) may be selectively inverted before being driven to the channels of bus 106 as encoded data signals (e.g., $DQC_0, DQC_1 \ldots DQC_n$). This may be accomplished by an inversion process. In such a process, each data bit, and an inverted version of the each data bit, may be applied to one or more multiplexers (MUXs) that are controlled by an encoding control signal.

The encoding control signal controls the multiplexer to select between the inverted versions of the data signals or the non-inverted versions of the data signals. For example, in a binary system, transmission of low signals that may be associated with a logical "0" on a bus may require more energy than transmitting a high signal that may be associated with a logical "1". In such a case, reducing the number of data bits that are transmitted as low signal states instead of high signal states can reduce the energy of the bus. An encoder that implements data bus inversion in such a case may change the data bits of a common unit interval for all of the lines of the bus to reduce the number of logical lows by inversion of the data bits. The inverted data bits are then transmitted as encoded data signals. Other embodiments of encoder 108 of the data system 102 may employ circuits that encode data to be transmitted by more complex encoding schemes other than a simple data bus inversion scheme.

Typically, an encoding control signal (shown as ENC in FIG. 1A) from detector 114 controls encoder 108. The control signal sets the encoding implemented by encoder 108. The state of the encoding control signal in a particular unit interval indicates whether, or how, the data signals of the bus in a corresponding data interval or unit interval are to be encoded. For example, the control signal may be set high to indicate that inverting should be employed by encoder 108 for the data to be transmitted in the present unit interval. Similarly, the control signal may be set low to indicate that inverting should not be employed by encoder 108 for data to be transmitted in the present unit interval. This may be understood as active high encoding. Alternatively, the encoding control, or bus invert, control signal may indicate inversion if the control signal is a low signal. This may be understood as active low encoding. The control signal may also be transmitted on bus 106 by a driver or drivers (not shown in FIG. 1A) of transmitter 104. The signal level of the control signal in any given unit interval of bus 106 represents the encoding state of the data transmitted on the bus in the same unit interval. This transmission may, for example, be accomplished by using a common transmission clock for transmitting the control signal and the data signals. Thus, the encoding control signal may also be utilized to control elements of a receiver on bus 106.

Data system 102 may also include receiver 110. Receiver 110 receives the signals from the lines of bus 106. For example, receiver 110 may include a plurality of slicers (not shown in FIG. 1A) to sample the analog values of each successive unit interval of the signals on bus 106 and to produce digital values by comparison of the sampled value with a threshold. These produced digital values (e.g., received encoded data signals shown as $DQRC_0, DQRC_1 \ldots DQRC_n$) will typically be the same as the data of the transmitted encoded data signals (e.g., $DQTC_0, DQTC_1 \ldots DQTC_n$). Similarly, one or more slicers may produce the encoding control signal (e.g., ENC) received in receiver 110.

Moreover, receiver 110 will typically include decoder 112. Decoder 112 is configured to selectively modify or decode the received encoded data signals (e.g., $DQRC_0, DQRC_1 \ldots DQRC_n$) to produce received data signals (e.g., $DQR_0, DQR_1 \ldots DQR_n$). Typically, the data of the data signals to be transmitted (e.g., $DQT_0, DQT_1 \ldots DQT_n$) will be the same as the received data signals (e.g., $DQR_0, DQR_1 \ldots DQR_n$). Thus, decoder 112 will complement encoder 108. For example, if encoder 108 implements inversion of the data of the data signals to be transmitted, decoder 112 will implement inversion of the data of the received encoded data signals. Similarly, other decoders may be implemented to decode the transmitted encoded data in the event that other encoding schemes are implemented in data system 102. Typically, the encoding control signal (ENC) received by receiver 110 may be implemented to control the decoding by decoder 112 for each unit interval as appropriate.

Figure 1B:
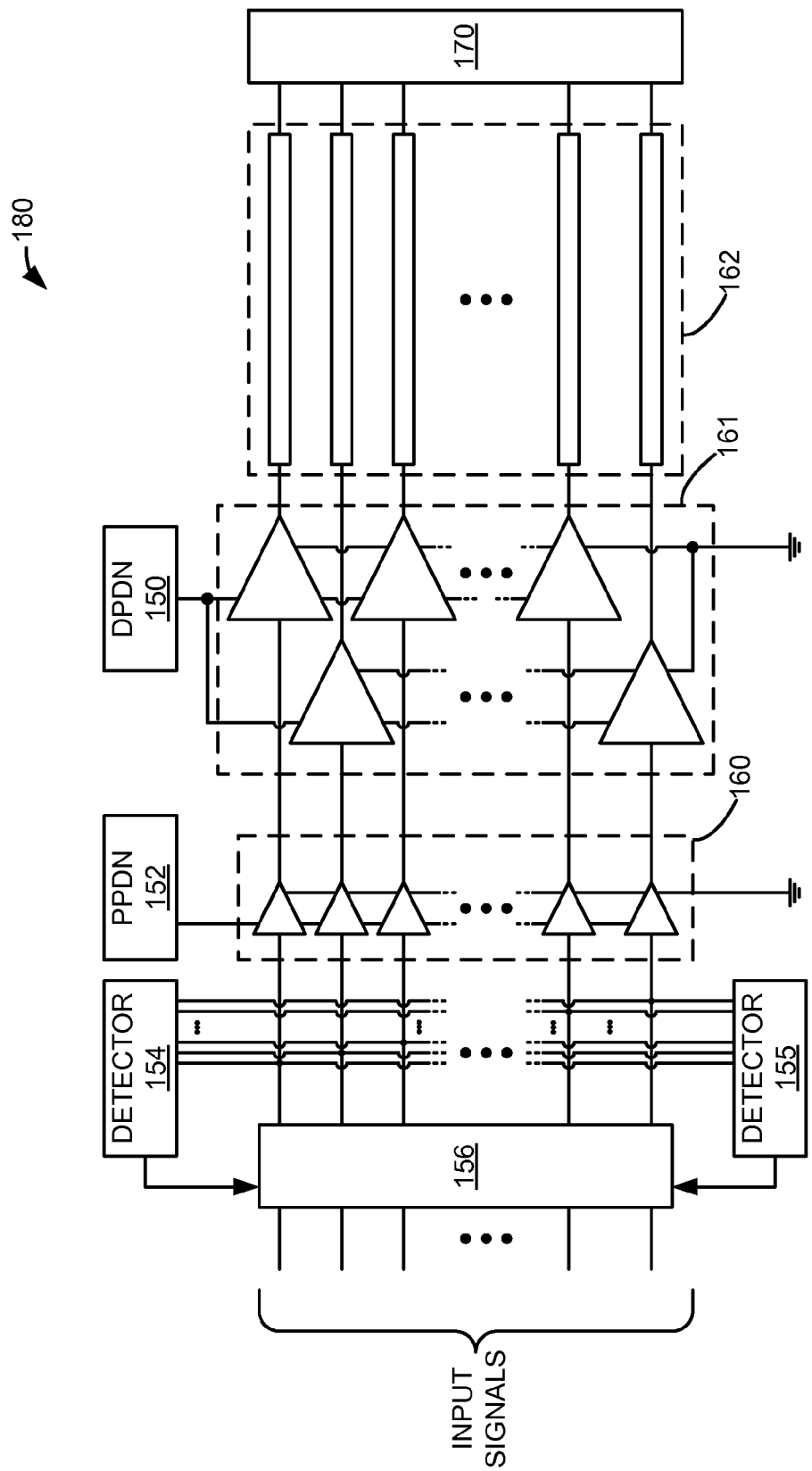
FIG. 1B is a block diagram illustrating example elements of an embodiment of a data system that is suitable for implementing frequency-based bus coding.

FIG. 1B is a block diagram illustrating example elements of an embodiment of a data system that is suitable for implementing frequency-based bus coding. The frequency-based coding system 180 shown in FIG. 1B may select an encoding based on the output of two detectors (154 and 155). Because there are two detectors 154 and 155, frequency-based coding system 180 may use multiple encoding schemes based on the multiple inputs from detectors 154 and 155. For example, as discussed previously, frequency based coding system 180 may encode in order to minimize a frequency component of signal lines driven to a certain logic level (e.g., minimize a frequency component of the number of "zeroes" being driven). This may be referred to as "DC" data bus inversion or "DBI_DC."

Frequency based coding system 180 may also encode in order to minimize a frequency component of the number of transitions of the switching signal lines (e.g., minimize a frequency component of the switches for "zero" to "one" and visa-versa.) This may be referred to as "DBI_AC." The multiple outputs of detectors 154 and 155 may be combined to select which encoding, if any, of DBI_AC or DBI_DC is selected. In addition, more complex coding schemes may be selected based on the outputs of detectors 154 and 155.

In FIG. 1B, frequency-based coding system 180 comprises driver power distribution network for a supply voltage (DPDN) 150, predriver power distribution network for a supply voltage (PPDN) 152, detector 154, detector 155, encoder 156, predrivers 160, drivers 161, bus 162, and receiving device 170. Typically, the predriver supply voltage and would be shared with other internal circuitry, but not shared with drivers 161. Similarly, the driver supply voltage would typically be dedicated to output drivers. However, in some circumstances, these power supply networks may be shared by internal circuitry, predrivers 160, and/or drivers 161.

DPDN 150 is connected to provide a power supply to drivers 161. Drivers 161 each drive a conductor (or line) of bus 162. Thus, the signals output by drivers 161 are carried by bus 162 to receiving device 170. PPDN 152 is connected to provide a power supply to predrivers 160. Predrivers 160 each drive at least one of drivers 161. Thus, the signals output by predrivers 160 are amplified and/or relayed by drivers 161 and then carried by bus 162 to receiving device 170.

The inputs to predrivers 160 are coupled to a first detector 154. The inputs to predrivers 160 are coupled to a second detector 155. An output of detector 154 is coupled to encoder 156. An output of detector 155 is coupled to encoder 156. Encoder 156 also receives input signals intended to be communicated to receiving device 170.

In an embodiment, detector 154 may perform the same or similar functions as described previously in connection with detector 114. Detector 154 may be implemented to detect or predict energy related characteristics associated with the channels or signal lines of bus 162. Detector 154 may produce an output which is coupled to encoder 156. This output may help determine the setting, or state, of the coding scheme of encoder 156 and/or the decoding done by receiving device 170. Detector 154 may be implemented to make a spectrum-based or frequency-based decision to help determine the encoding of data to transmitted on bus 162.

A frequency response of detector 154 may be set to detect a frequency characteristic of the data transmitted on bus 162. This detection may allow for the encoding by encoder 156 to change under certain transmission conditions of bus 162 such that the transmitted data has a smoothed or shaped frequency characteristic around a certain frequency. For example, detector 154 may be implemented to control the encoding by encoder 156 as a function of an aggregate current of some or all of the lines of bus 162. This control may change this current so that its spectral content is low in energy at or around a chosen frequency, such as a resonant frequency or frequencies. These resonances may be associated with an undesirable, or increased, noise condition of a power delivery network of the system, such as DPDN 150. It should also be understood that detector 154 may also be implemented to contribute to (or make) encoding decisions that do not reduce peak energy or noise characteristics.

Detector 154 may evaluate two or more unit intervals of input signals to be transmitted. This evaluation may include other or all signal lines of the bus such as line(s) indicating bus encoding, masking signal line(s), address line(s), and/or control line(s). This evaluation may include signal lines from other busses and/or integrated circuits. The evaluation may detect an existing, or predict a potential, undesired frequency resonance situation. In response to this detection by detector 154, encoder 156 may make a change in encoding. This change may be designed to avoid, or reduce, undesirable or detrimental resonances on bus 162 and/or power distribution network 150.

In an example, a particular resonant frequency of DPDN 150 may be determined. Detector 154 may then be configured to respond at or about that frequency. In other words, detector 154 produces an output that varies in time according to a frequency characteristic associated with the resonant frequency. When detector 154 responds to that frequency, an encoding scheme may be selected (or changed) by encoder 156 to avoid less desired operating conditions for DPDN 150. Detector 154 may be implemented with one or more filters. Detector 154 may then generate an output for setting the encoding used by encoder 156 based on the output of the one or more filters. Detector 155 may be implemented using the filters and techniques described previously.

Detector 155 may be implemented to detect or predict frequency related characteristics associated with switching of predrivers 160 and/or the switching of channels or signal lines of bus 162. Detector 155 may produce an output which is coupled to encoder 156. This output may help control the setting of the state of the coding scheme of encoder 156 and/or the decoding done by receiving device 170. Like detector 154, detector 155 may be implemented to make a spectrum-based or frequency-based decision to help control the encoding of data to transmitted on bus 162.

Detector 155 may be set to detect a frequency characteristic of the switching of the logic levels transmitted on bus 162. This detection may allow encoder 156 to change encodings under certain transmission conditions. The switching of these encoding may be selected such that the switching current associated with bus 162, or predrivers 160, has a smoothed or shaped frequency characteristic around a certain frequency (ies). For example, detector 155 may be implemented to help control the encoding by encoder 156 as a function of an aggregate switching current of some or all of the lines of bus 162 and/or predrivers 160. This control may change the switching current so that it is low in energy at or around a chosen frequency, such as a resonant frequency or frequencies. These resonances may be associated with an undesirable, or increased, noise condition of a power delivery network of the system, such as PPDN 152. It should also be understood that detector 155 may also be implemented to contribute to (or make) encoding decisions that do not reduce switching noise characteristics.

Similar to detector 154, detector 155 may evaluate two or more unit intervals of input signals to be transmitted. This evaluation may include other, or all, signal lines of the bus such as line(s) indicating bus encoding, masking signal line(s), address line(s), and/or control line(s). This evaluation may include signal lines from other busses and/or other integrated circuits. The evaluation may detect an existing, or predict a potential, undesired frequency resonance situation. In response to this detection by detector 155, encoder 156 may make a change in encoding. This change may be designed to avoid or reduce undesirable or detrimental resonances on predriver power distribution network 152. Problems avoided by the encoding change may include resonance noise on the predriver power delivery network 152 caused by predriver logic switching, and, noise injection to other circuits that have specific frequency sensitivities such as PLLs, DLLs, filters, clock buffers, etc.

A particular resonant frequency of PPDN 152 may be determined. Similar to detector 154, detector 155 may then be designed or configured to respond at or about that frequency. When detector 155 responds to that frequency, (i.e., detector 155 recognizes a correlation between the resonance frequency and the switching currents on predriver power distribution network 152) an encoding scheme may be selected (or changed) by encoder 156 to avoid less desired operating conditions for PPDN 152. Detector 155 may be implemented using the filters and techniques described previously.

In an embodiment, instead of a frequency based decision, data bus inversion may be applied according to the number of signal line transitions and the number of signal lines to be driven to a particular state. For example, DBI_AC encoding may be applied by default. This may reduce high frequency noise. (E.g., detector 155 may control encoder 156 to apply DBI based on the number of signal line transitions.) However, DBI_AC may be applied (or override DBI_DC) if the number of bits to be driven to a particular logic state exceeds a threshold. In other words, if the number of bits on the encoded signal lines is going to exceed a certain number (e.g., 6 of 8 bits), then DBI_DC is applied (instead of DBI_AC) to determine the encoding. (E.g., detector 155 may "override" the encoding by detector 154 because the encoding selected by detector 154 will exceed a threshold number of bits being sent having a particular state.)

Figure 2A:
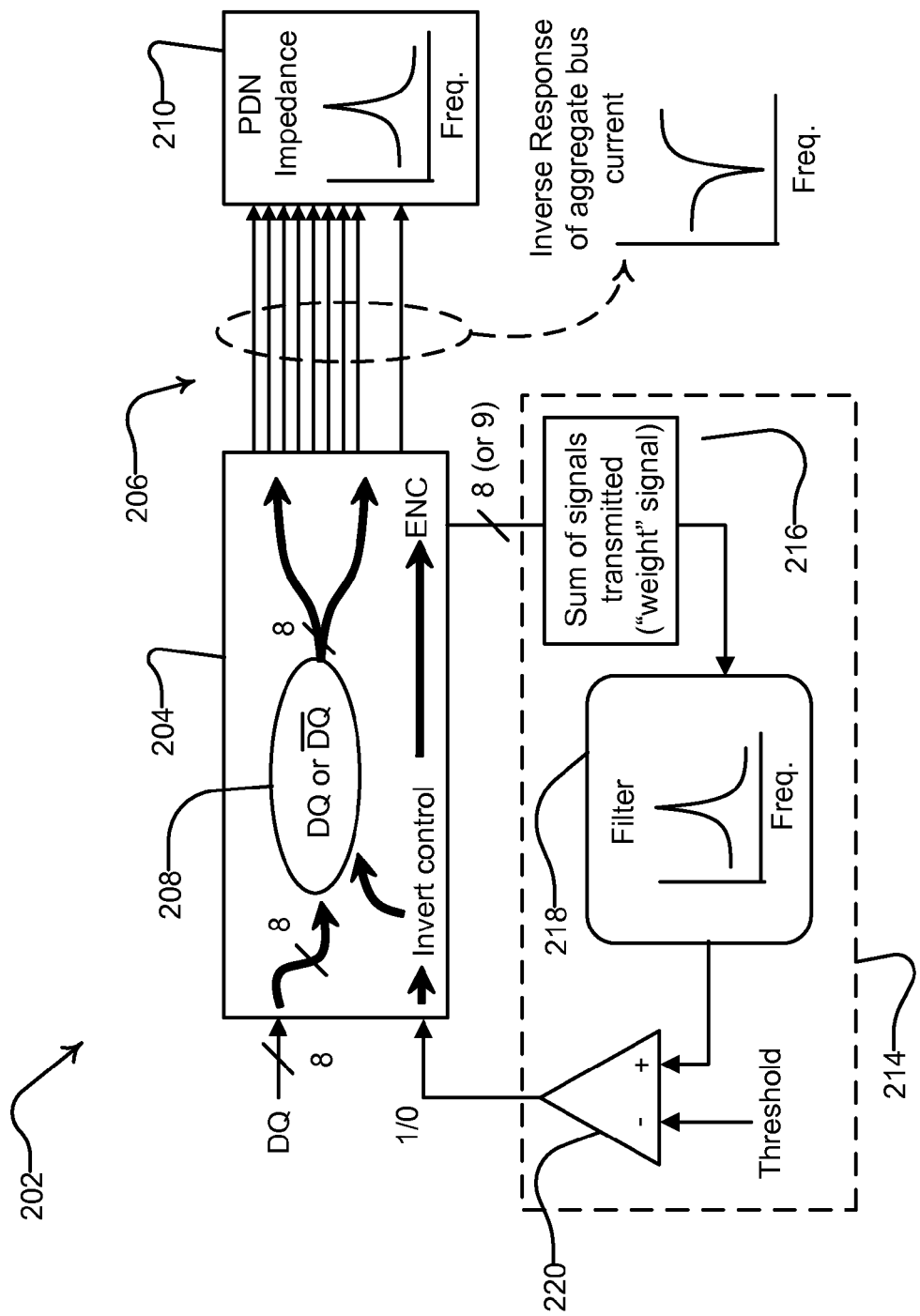
FIG. 2A is a diagram illustrating an example data bus inversion coding embodiment of frequency-based coding.

An embodiment of data system 202 implementing frequency-based bus encoding technology is illustrated in FIG. 2A. The present embodiment may be used with any of the examples introduced above (e.g., to avoid RF interference with other nearby devices, or to implement other criteria, such as avoiding a bus switching excitation frequency that coincides with the resonant frequency of the system power delivery network.) For this purpose, the depicted embodiment determines a power-related measure for data of bus 206 in detector 214. Such a power-related measure may be a Hamming weight. The power-related measure may be determined as the weighted sum of the transmitted bits multiplied by the power of the respective symbol. The summed bits may include the transmitted data as well as any invert control bit and may even include any other control or addressing bits that are transmitted on bus 206.

In the embodiment of FIG. 2A, transmitter 204 includes encoder 208 that implements a data bus inversion coding scheme. Receiver 210 shown in FIG. 2A may be similar to the receiver introduced in connection with the embodiments of FIGS. 1A and 1B.

Detector 214 includes summer 216, a filter 218 and an encoding control set element, such as a comparator 220. Although filter 218 is illustrated as a bandpass filter it may be implemented as a low-pass filter. Summer 216 predicts an aggregate current of bus 206 by summing together signals representing the bits of data (e.g., $DQT_1 \ldots DQT_n$) to be transmitted at each unit interval, and by inputting the output of the summer to filter 218.

The transfer function of filter 218 may be of the form of a bandpass filter with a center frequency at or near a resonance frequency of the system and/or a frequency band. For example, the bandpass filter may be centered near the peak resonance of the power supply distribution network or the peak gain of a phase locked loop, or for one or more other specific frequencies or frequency bands. In the example of FIG. 2A, the output of the bandpass filter is a signal representing bus current at an undesired frequency range represented by the filter. The output of the filter 218 is applied to comparator 220. A comparison of the output of filter 218 and a threshold supplied to comparator 220 produces an encoding control signal to control inversion by encoder 208 according to the desired encoding scheme. For example, the output of a bandpass filter can cause encoder 208 to invert the logic states of each line of bus 206 (i.e., Data Bus Inversion or DBI). The threshold signal used at the input of the comparator 220 may be dynamically varied, for example, to effectuate a weight measure based on a sum of incoming, unencoded bits. With such a changing of the "weight" of the aggregate current as a function of a detected frequency of a predicted current, the spectral content of bus 206 may be shaped in a different manner when compared to a system without detector 214.

Figure 2B:
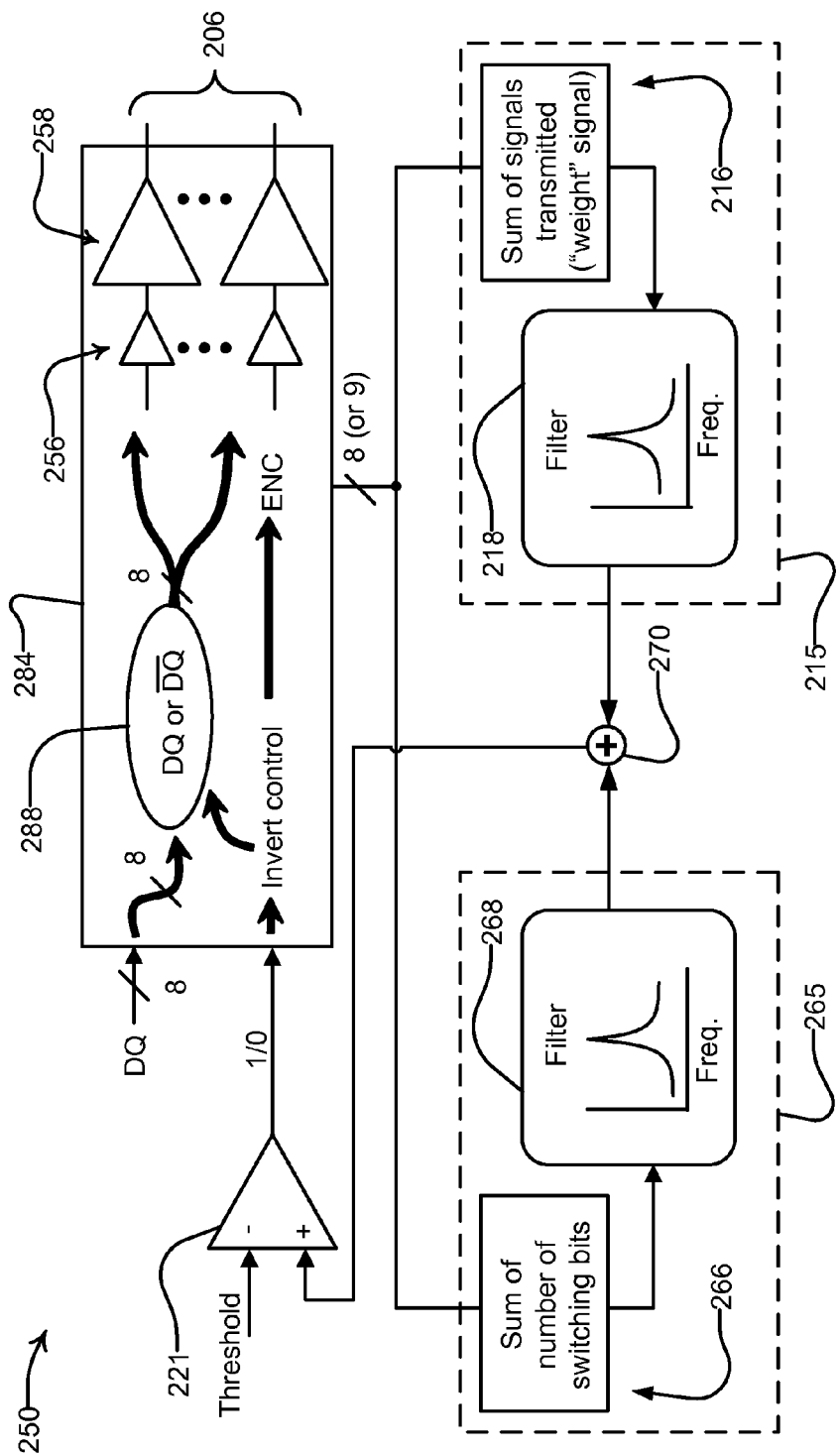
FIG. 2B is a diagram illustrating an example data bus inversion coding embodiment of frequency-based coding.

FIG. 2B is a diagram illustrating an example data bus inversion coding embodiment of frequency-based coding. In FIG. 2B, data system 250 comprises detector 215, detector 265, comparator 221, summer 270, transmitter 284, and bus 206. Detector 215 includes summer 216 and filter 218. Detector 265 includes summer 266 and filter 268. Transmitter 284 includes encoder 288, predrivers 256, and drivers 258.

The embodiment illustrated in FIG. 2B may be used with any of the examples introduced above (e.g., to avoid RF interference with other nearby devices, to reduce interference with sensitive circuits such as PLLs, or to implement other criteria, such as avoiding a bus switching excitation frequency that coincides with a resonant frequency of a system power delivery network.) For this purpose, the depicted embodiment determines, in detector 215, a power-related measure for data of bus 206 in the detector 215. This power-related measure may be determined in a manner described previously.

The depicted embodiment, in detector 265, also determines a switching power-related measure. The switching power related measure may correspond to the number of bits that switch from unit time interval to unit time interval. The number of switching bits counted may include any invert control bits and/or other control or addressing bits controlled by predrivers 256.

In FIG. 2B, a transmitter 284 includes an encoder 288 that implements a data bus inversion coding scheme. The outputs of encoder 288 are input to predrivers 256. The outputs of predrivers 256 are input to drivers 258. The outputs of drivers 258 are coupled to bus 206. A receiver, not shown in FIG. 2B, may be receive inputs from bus 206 and be similar to the receiver introduced in connection with the embodiments illustrated in FIGS. 1A and 1B.

Detector 215 includes summer 216 and filter 218. Although filter 218 is illustrated as a bandpass filter, it may be implemented as a high-pass filter, a low-pass filter, or any other desired type of filter (e.g., bandpass, multiple band bandpass, etc.). Summer 216 predicts an aggregate current of bus 206 and/or the PDN used by drivers 258 by summing together signals representing the bits of data (e.g., $DQT_1 \ldots DQT_n$) to be transmitted at each unit interval and by inputting the output of summer 216 to filter 218.

The transfer function of filter 218 may be of the form of a bandpass filter with a center frequency at or near a resonance frequency of the system and/or a frequency band. For example, the bandpass filter may be centered near the peak resonance of the power supply distribution network or the peak gain of a phase locked loop, or for one or more other specific frequencies or frequency bands. In the example of FIG. 2B, the output of the bandpass filter is a signal representing the bus signals at the undesired frequency range represented by the filter. The output of filter 218 is applied to summer 270.

Detector 265 includes summer 266 and filter 268. Filter 268 may also be implemented using various types of filters described previously. Summer 266 predicts an aggregate switching current of predrivers 256 and/or the PDN used by predrivers 256 by determining and then summing together signals representing the bits that have changed between each unit interval, and by inputting the output of the summer 266 to filter 268.

The transfer function of the filter 268 may be of the form of a bandpass filter with a center frequency at or near a resonance frequency of the system, a PDN, and/or a frequency band. For example, the bandpass filter may be centered near the peak resonance of the power supply distribution network that supplies predrivers 256, or the peak gain of a phase locked loop, or for one or more other specific frequencies or frequency bands. In the example of FIG. 2B, the output of the bandpass filter is a signal representing bus switching noise at an undesired frequency range represented by the filter. The output of filter 268 is applied to a summer 270.

The output of filter 218 and the output of filter 268 are summed by summer 270. The outputs of filters 218 and 268 may be weighted by summer 270 before being added together. A comparison of the output of summer 270 and a threshold by comparator 221 produces an encoding control signal to control encoder 288 according to the desired encoding scheme. For example, the output of summer 270 can cause encoder 288 to invert the logic states of each line of bus 206 thus implementing Data Bus Inversion or DBI). The threshold signal used at the input of the comparator 221 may be dynamically varied, for example, to effectuate a weight measure based on the properties (e.g., number of switching bits, weight of incoming bits, etc.) of incoming, unencoded bits. With such a changing, the spectral content of bus 206 may be shaped in a different manner when compared to a system without the detectors 215 and 265.

Figure 2C:
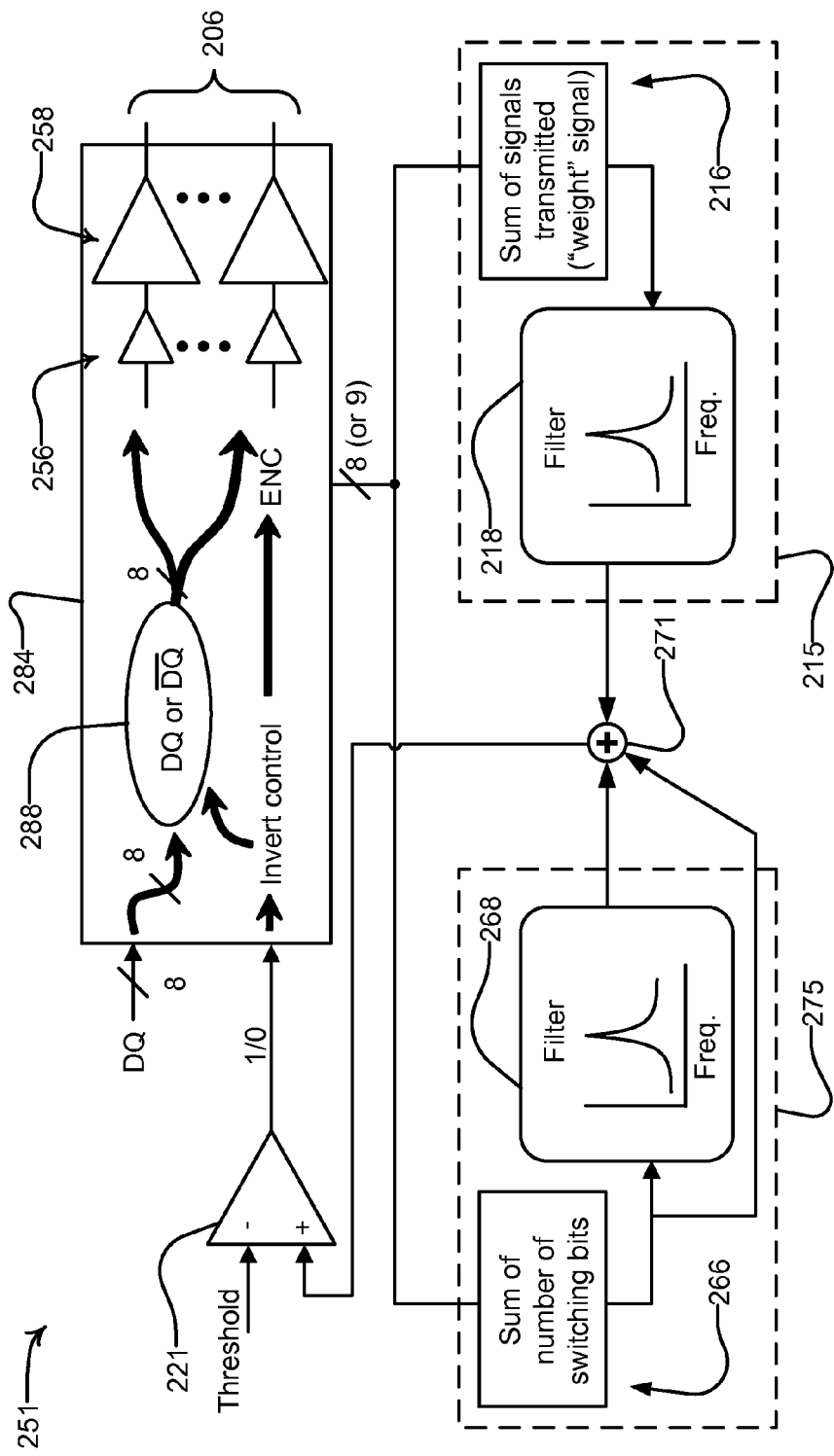
FIG. 2C is a diagram illustrating a second example data bus inversion coding embodiment of frequency-based coding.

FIG. 2C is a diagram illustrating a second example data bus inversion coding embodiment of frequency-based coding. In FIG. 2C, data system 251 comprises detector 215, detector 275, comparator 221, summer 271, transmitter 284, and bus 206. Detector 215 includes summer 216 and filter 218. Detector 275 includes summer 266 and filter 268. Transmitter 284 includes encoder 288, predrivers 256, and drivers 258.

Data system 251 illustrated in FIG. 2C is the same as data system 250 illustrated in FIG. 2A except that detector 265 has been replaced by detector 275 and summer 270 has been replaced by summer 271. Detector 275 is the same as detector 265 except it has an extra output that goes to summer 271. Thus, summer 271 has three inputs. The additional output of detector 275 is the output of summer 266.

The output of filter 218, the output of filter 268, and the output of summer 266 are summed by summer 271. The outputs of filters 218 and 268, and/or the output of summer 266 may be weighted before being added together by summer 271. A comparison of the output of summer 271 and a threshold by comparator 221 produces an encoding control signal to control encoder 288 according to the desired encoding scheme. For example, the output of summer 271 can cause encoder 288 to invert the logic states of each line of the bus 206. The threshold signal used at the input of comparator 221 may be dynamically varied, for example, to effectuate a weight measure based on the properties (e.g., number of switching bits, weight of incoming bits, etc.) of incoming, unencoded bits. With such a changing, the spectral content of the bus may be shaped in a different manner when compared to a system without detectors 215 and 275. As can be seen in FIG. 2C, the three inputs to summer 271 allow an encoding decision to be based on the bus weight, filtered bus weight, and filtered number of changed bits. This may be used to implement a balance between power consumption, low or medium simultaneous switching output (SSO) noise, high frequency SSO noise, and crosstalk noise.

Figure 2D:
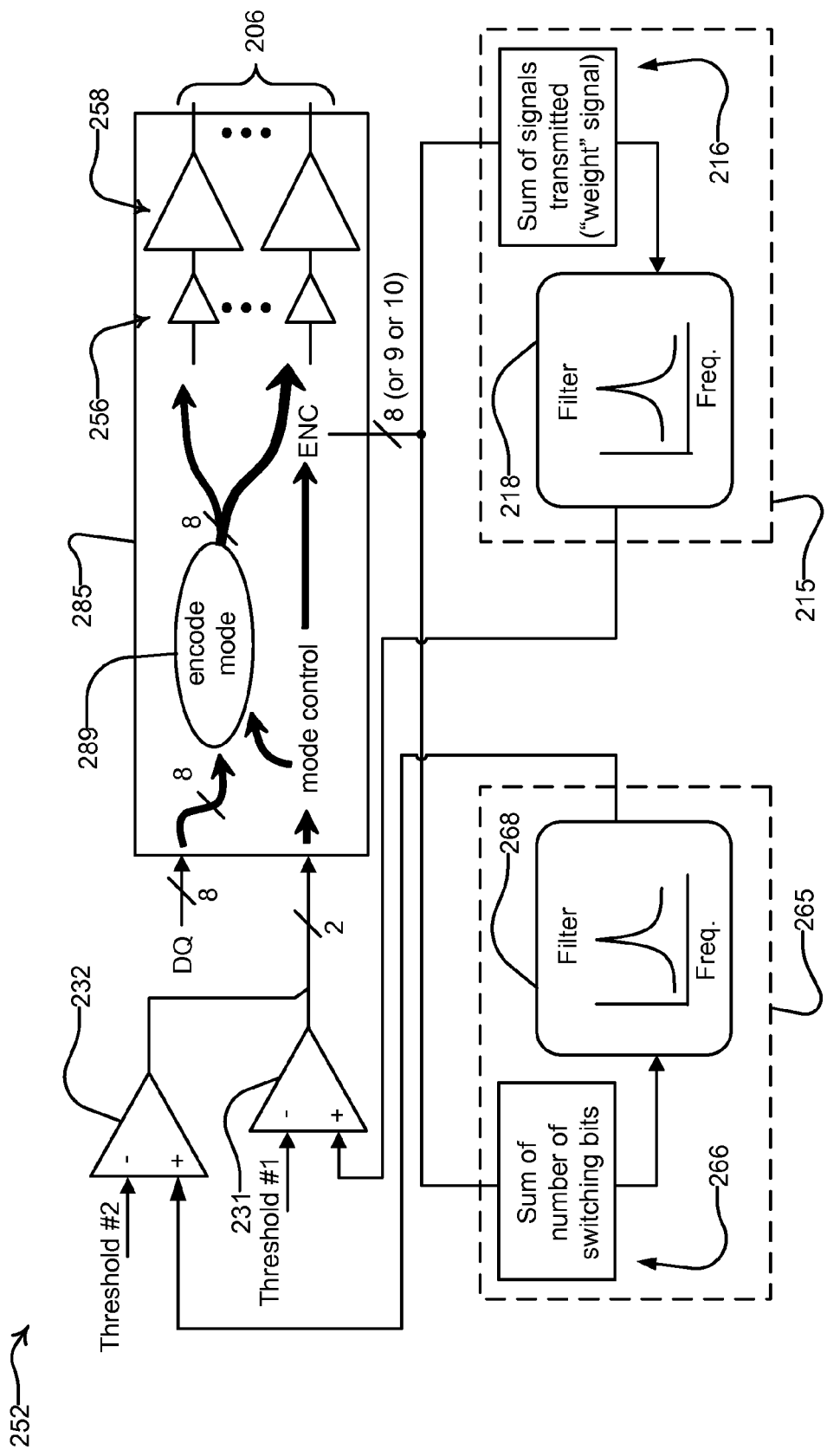
FIG. 2D is a diagram illustrating an example embodiment of frequency-based coding.

FIG. 2D is a diagram illustrating an example embodiment of frequency-based coding. In FIG. 2D, data system 252 comprises detector 215, detector 265, comparator 231, comparator 232, transmitter 285, and bus 206. Detector 215 includes summer 216 and filter 218. Detector 265 includes summer 266 and filter 268. Transmitter 285 includes encoder 289, predrivers 256, and drivers 258.

The embodiment illustrated in FIG. 2D may be used with any of the examples introduced previously. The depicted embodiment determines a power-related measure for data of bus 206 in detector 215. This power-related measure may be determined in any of the manners described previously.

The depicted embodiment also determines a switching power-related measure in detector 265. The switching power related measure may correspond to the number of bits that switch from unit time interval to unit time interval. The number of switching bits counted may include any invert control bits and/or other control or addressing bits controlled by predrivers 256.

In FIG. 2D, transmitter 285 includes encoder 289 that implements multiple encoding modes. In an example, these encoding modes may include no inversion, data bus inversion, and an XOR of the data against a predetermined pattern. Thus, in this example, there are three coding schemes. The coding scheme used is selected based on the outputs of comparators 231 and 232. For example, when the outputs of both comparators 231 and 232 are low, no inversion may be used; when the outputs of comparators 231 and 232 are different, the data may be XOR's against the predetermined pattern; and, when the outputs of both comparators are high, data bus inversion may be used. Other combinations, additional comparators and thresholds, and more encoding schemes, may be used.

The outputs of encoder 289 are input to predrivers 256. The outputs of predrivers 256 are input to drivers 258. The outputs of drivers 258 are coupled to bus 206. A receiver, not shown in FIG. 2D, may be receive inputs from bus 206 and be similar to the receiver introduced in connection with the embodiments illustrated in FIGS. 1A and 1B.

Detector 215 includes summer 216 and filter 218. In the example of FIG. 2D, the output of the bandpass filter is a signal representing the bus signals at an undesired frequency range represented by the filter. The output of filter 218 is applied to comparator 231.

Detector 265 includes summer 266 and filter 268. In the example of FIG. 2D, the output of the bandpass filter is a signal representing bus switching noise at an undesired frequency range represented by the filter. The output of filter 268 is applied to comparator 232.

The output of filter 218 is compared to a first threshold by comparator 231. The output of filter 268 is compared to a second threshold by comparator 232. The outputs of comparators 231 and 232 produce encoding control signals to control encoding by encoder 289 according to one of several desired encoding schemes. For example, the output of comparator 231 can cause encoder 289 to invert the logic states of each line of bus 206. The output of comparator 232 may override this inversion to cause the logic state of each line of bus 206 to be output normally. In another example, the output of comparator 231 can cause encoder 289 to apply a first encoding scheme and the output of comparator 232 may cause encoder 289 to apply a second encoding scheme. In another example, because there are four possible states for the outputs of comparators 231 and 232, the outputs of comparators 231 and 232 may cause encoder 289 to apply one of four encoding schemes.

The threshold signals used at the inputs of the comparators 231 and 232 may be dynamically varied, for example, to effectuate a weight measure based on the properties (e.g., number of switching bits, weight of incoming bits, etc.) of incoming, unencoded bits. With such a changing, the spectral content of the bus may be shaped in a different manner when compared to a system without the multiple thresholds provided by comparators 231 and 232.

Because there are two detectors shown in FIGS. 2B, 2C, and 2D, frequency-based coding systems 250-252 may use multiple encoding schemes based on the multiple inputs from these detectors. This allows encoding(s) to be applied in a manner that reduces predriver power switching noise as well as main driver power switching noise. Because predriver power switching noise may be the main component contributing to jitter, and main driver power switching noise causes its own problems, being able to change encodings based on both predriver power switching noise, and driver power switching noise can be used to address a broader range of switching noise issues than addressing only one of these problems by itself.

In coding systems 250-252, eight (8) data lines on bus 206 are illustrated. However, any of these coding systems 250-252 may be implemented with fewer or additional data lines. Moreover, where only a single control line for the encoding control signal is illustrated, the coding system 250-252 and bus 206 may also implement additional or other control or addressing signals.

An infinite impulse response filter ("IIR") may be used in the embodiments of the aforementioned detectors. Such a filter may be implemented as an analog or digital element of the circuit. The filter may accumulate scaled values of the history of the bus output weight (e.g., based on summing multiple unit intervals of the currents of the bus lines or switching weights) to make the frequency-based bus coding or inverting decision. The plot in FIG. 3A illustrates a frequency response of an example 3-tap filter structure (2 coefficients with a delayed output history) that may be implemented in the feedback loop of an embodiment of the detectors described previously. The graph of FIG. 3A represents a frequency response of a bandpass filter. The graph of FIG. 3B represents an inverse of the frequency response of FIG. 3B. These plots illustrate a system that could be based on a data rate of 5 Gbps, with the output of the filter sampled at Fs=5 GHz. The example IIR bandpass filter may be described by a transfer function as follows:

$$H(z) = \frac{1}{1 - a \cdot z^{-1} + b \cdot z^{-2}}$$

Setting the coefficient values of "a" and "b" to appropriate values may adjust the center frequency of the filter to a desired frequency. For example, one possible way to shift the center frequency of this filter is to adjust the "a" filter coefficient. A solution for placing the center frequency precisely may be determined with the equation, "a=2*cos(Fr/Fs)", where Fr is the resonance frequency of a system and Fs is the sampling frequency of the filter. It should be understood that "a" and "b" may be positive or negative. In general, the values of "a" and "b" (or their equivalents for other filter transfer functions) have values (and signs) determined by the desired filter response and the elements used to implement the filters.

Figure 4A:
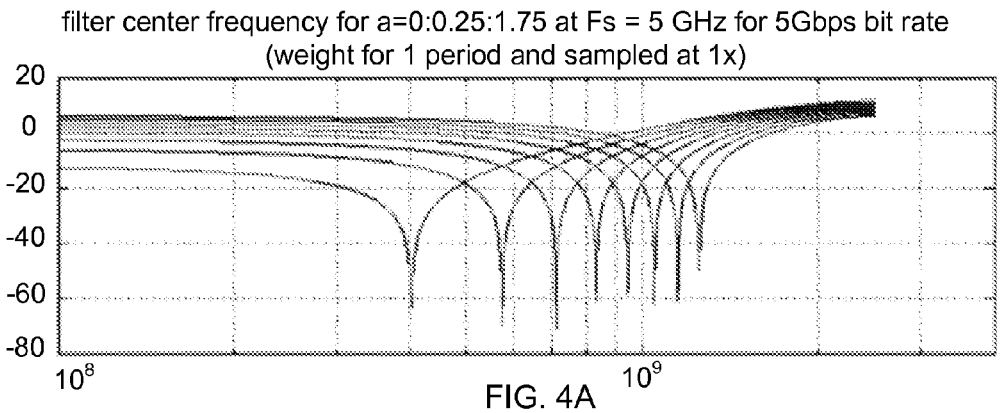
FIG. 4A plots the inverse of a filter frequency response of an example detector.
Figure 4B:
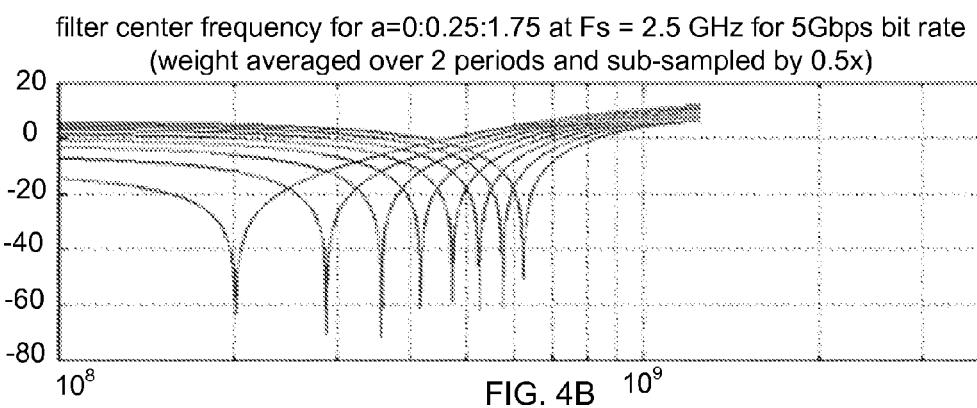
FIG. 4B plots the inverse of a filter frequency response of an example detector.
Figure 4C:
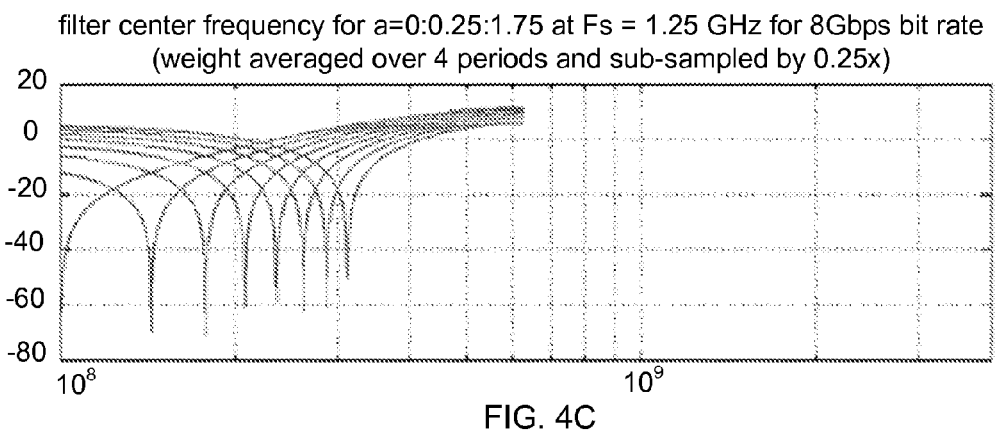
FIG. 4C plots the inverse of a filter frequency response of an example detector.

Placing the notch of the filter precisely at frequencies much lower than Fs may make it difficult to precisely set the value of "a", given the sensitivity of "a" to even small changes in Fs. To reduce this sensitivity, a sub-sampling or decimation approach could also be used. By modifying the filter coefficients and/or the sampling rate of the filter, the filter of the detector may be constructed to have a chosen frequency response for the bus of a system to avoid undesirable energy characteristics in the bus. FIGS. 4A, 4B and 4C each plot the inverse of the frequency responses for the example filter with different values for the "a" coefficient of the filter transfer function. Each curve is based on a value of the "a" coefficient in the range of 0 to 1.75 in steps of 0.25, with the sampling rate at Fs, Fs/2, and Fs/4 respectively.

Using a sub-sampling approach can permit an easier placement of the notch at lower frequencies by reducing the sensitivity of the notch frequency to the filter coefficients (e.g., the "a" coefficient). The ½ X sub-sampling approach would average adjacent weight values (in time) in a digital and/or analog implementation and set the encoding control (ENC) based on this stream. The use of sub-rate sampling and additional taps is a suitable approach in a digital implementation. However, a mixed analog/digital implementation would also have the option of fine-tuning the placement of the filter center frequency using analog circuitry. A still further option for tuning of the center frequency would be to additionally have some control over the on-chip bypass capacitance.

The detector of the system may have a programmable filter capable of being tuned for at least one of several possible frequency responses. In such a system, coarse coefficients adjustments may be made such as in a digital filter implementation. If the bus of the system is also implemented with a programmable on-chip bypass capacitance, the resonance frequency of the PDN may be adjusted during system performance by adjusting the on-chip bypass capacitance. In conjunction with such changes to the PDN, the detector may also be adjusted in such an embodiment so that the desired frequency response of the detector will still have the desired frequency response relative to the adjustments made to the on-chip bypass capacitance and the resonant frequency of the PDN. As alluded to earlier, the filter may also be implemented in a multi-modal manner, with preprogrammed modes being selectively or dynamically set during device operation.

Figure 5A:
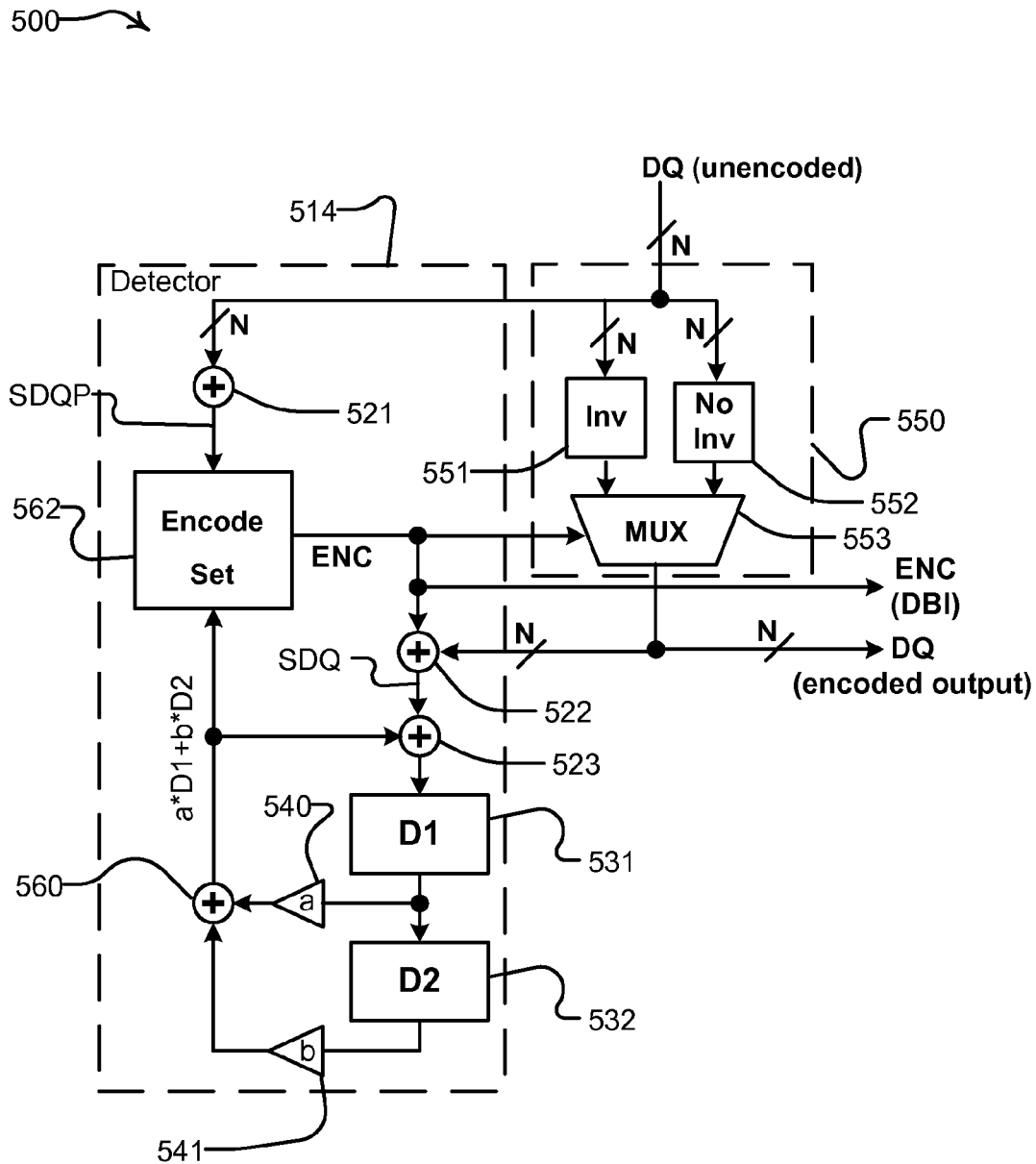
FIG. 5A is a block diagram illustrating elements of a frequency-based detector and encoder.

FIG. 5A is a block diagram of a system 500 that includes a frequency-based detector 514 and an encoder 550. Detector 514 includes one or more delay elements 531, 532 (also shown as "D1" and "D2", respectively, in FIG. 5A), one or more amplification elements 540, 541 (also shown as "a" and "b" respectively in FIG. 5A), one or more adders 521, 522, 523, 560 that together make up a filter (i.e., a "filter portion" of the detector) and an encode set element 562.

The encoder 550 may be implemented as an invert/pass element configured to modify the incoming unencoded data (shown as "DQ unencoded" in FIG. 5A) so that an aggregate bus weight signal (labeled "SDQ" in FIG. 5A) is generated to represent the weight that was actually transmitted on the bus. For example, unencoded data may be both inverted in inverter 551 and applied to a delay element 552 to provide no inversion. This maintains similar timing for both encoded (inverted) an unencoded (not inverted) data signals. Multiplexer 553 then passes the appropriate signals (encoded or not) based on the encoding control signal applied to multiplexer 553 from encode set element 562. In some embodiments, the invert/pass element may be, or share, components of the encoder or decoder of the system since they provide similar functions.

Adder 522 sums data signals of the bus and the encoding control signal to generate a sum that represents the aggregate current of the bus (i.e., in the embodiment of FIG. 5A, the encoding control signal is a "DBI" or "DBI_DC" signal transmitted as part of bus communications). In this way, the filter delay elements 531 and 532 will obtain accurate aggregate bus weight information and thereby have an accurate history of bus transfer information.

In FIG. 5A, adder 521 sums data signals for use in the encoding logic decision made by encode set element 562. The output of adder 521 is SDQP. Encode set element 562 generates the DBI control or encoding control (ENC) signal. Based on the incoming aggregate weight signal SDQP, and historical aggregate bus weight information maintained in the delay elements 531 and 532 of the filter portion of the detector 514, a frequency-based bus encoding control determination will be made. As will be explained in more detail herein with respect to FIG. 5B, encode set element 562 may include one or more comparators configured to help make the encoding decision.

The output signal of adder 522 is input to adder 523. This adds the new aggregate bus weight signal to the output signal of the filter (shown as "a*D1+b*D2"). The output of adder 523 is applied to a first delay element 531 (D1). The first delay element may typically include a register or other data store or latch element to hold the input value for at least one unit interval. The output of first delay element 531 is applied to a second delay element and to first amplification element 540. The second delay element may also typically include a register or other data store or latch element to hold the input value for at least one unit interval. The first amplification element 540 applies a gain corresponding to a coefficient of the filter such as an "a" coefficient of any of the filter transfer functions previously mentioned.

The output of second delay element 532 (D2) is applied to a second amplification element 541. The second amplification element 541 applies a gain corresponding to a coefficient of the filter such as a "b" coefficient of any of the filter transfer functions previously mentioned. The output signals of each of the amplification elements 540 and 541 are applied to adder 560. Adder 560 produces the filter output signal (shown in FIG. 5 as "a*D1+b*D2") which is input to encode set element 562. In this embodiment, although two delay elements (531 and 532) and two amplification elements (540 and 541) are illustrated, additional or fewer such elements may also be implemented in the filter portion of detector 514 depending on the desired filter transfer function. The filter transfer function(s) implemented in detector 514 may be based on a designed frequency response of the filter of detector 514.

Figure 5B:
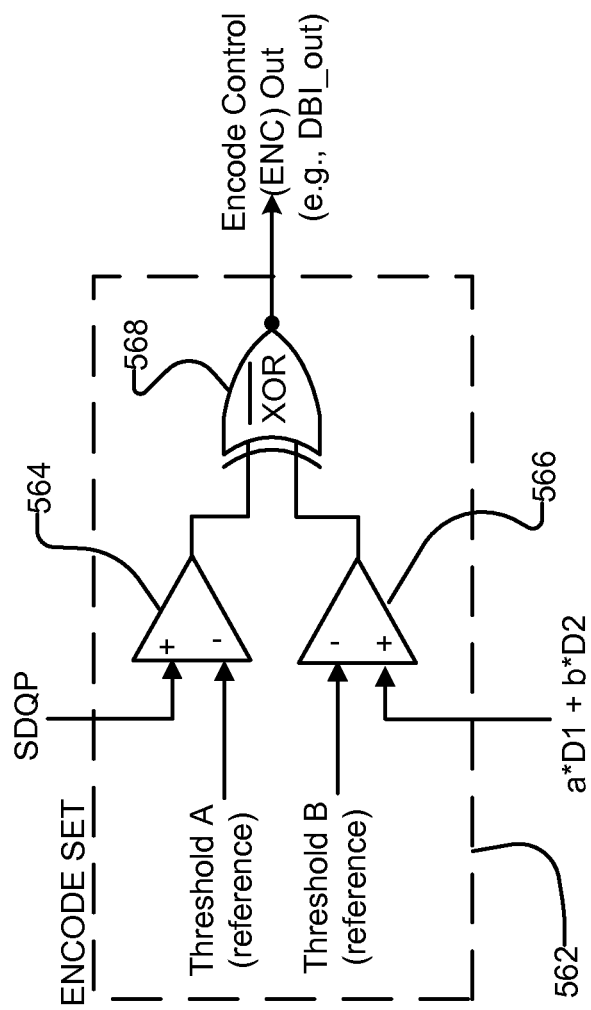
FIG. 5B is a block diagram showing elements of an encoding set or decision element of the detector embodiment of FIG. 5A.

One example of encode set element 562 is illustrated in FIG. 5B. Encode set element 562 comprises comparator 564, comparator 566, and logic gates 568. As previously mentioned, the aggregate bus weight signal SDQP is applied to a first comparator 564 in the encode set element 562. The comparator may be configured to compare the signal with a threshold (shown as "Threshold A") to assess whether coding is necessary. For example, for a DBI_DC encoding scheme, the threshold comparison may indicate inversion if the weight of the signal exceeds a desired weight (e.g., a threshold indicative of 50% of the potential aggregate current of the bus). Similarly, the output signal (shown as "a*D1+b*D2" in FIGS. 5A and 5B) of the filter portion detector 514 is applied to a second comparator and also compared with a threshold (shown as "Threshold B"). Threshold B may be the same or different from threshold A and may depend on the gain attributable to the amplification elements of the filter. Although analog comparators are illustrated in the example encode set element 562 of FIG. 5B, it may also optionally be implemented with digital components such as digital magnitude comparators.

The outputs of comparators 564 and 566 may then be applied to one or more logic gates 568 (shown in FIG. 5B as an XNOR gate), to set the encoding control signal as a function of the outputs of comparator 564 and 566. For example, depending on the output of the filter, if encoding is needed for the next transfer, the output of logic gate 568 may be set high. If encoding is not needed, the output of logic gate 568 may be set low.

Figure 6A:
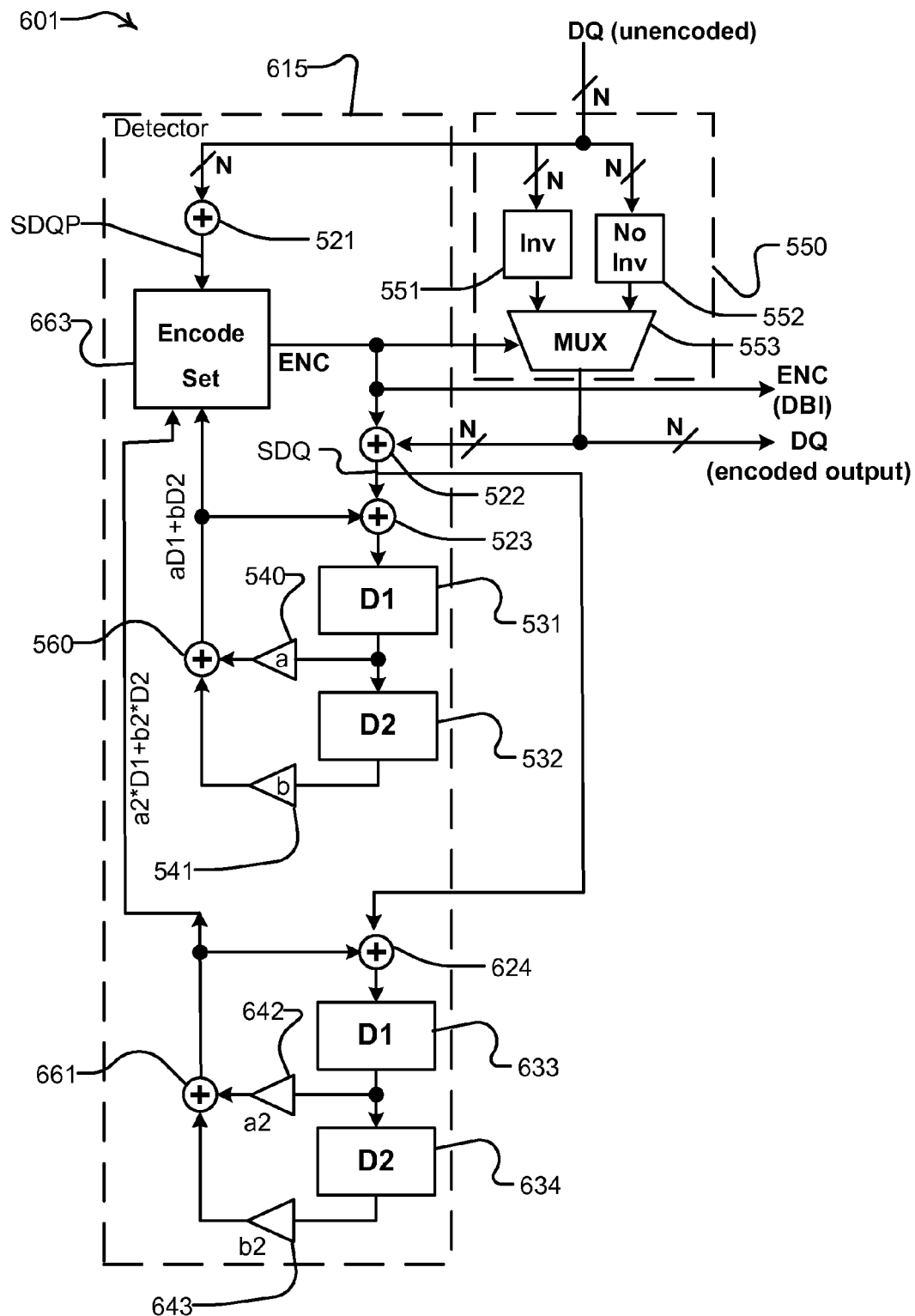
FIG. 6A is a block diagram illustrating elements of a multiple frequency response embodiment of a detector and encoder similar to FIG. 5A.
Figure 6B:
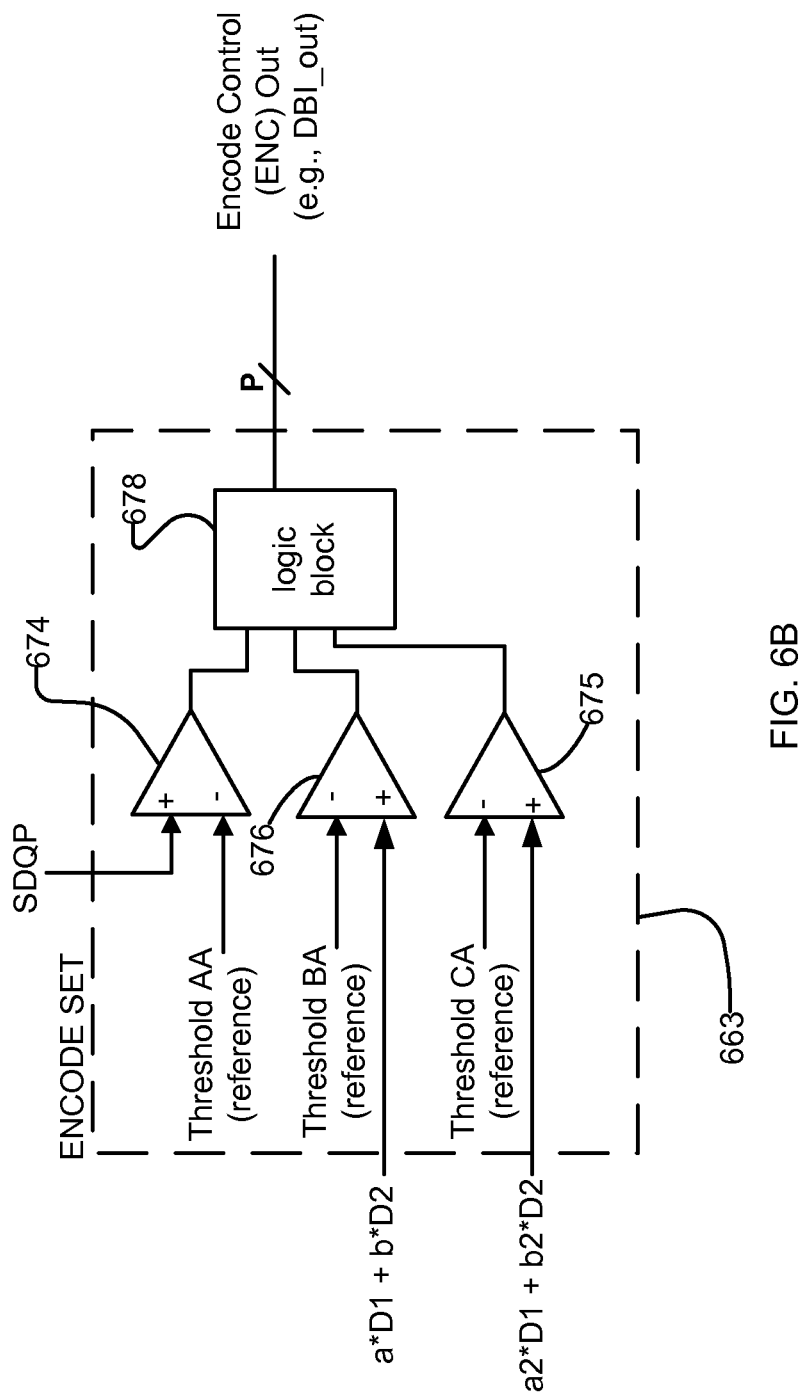
FIG. 6B is a block diagram showing elements of an encoding set or decision element of the detector embodiment of FIG. 6A.
Figure 6C:
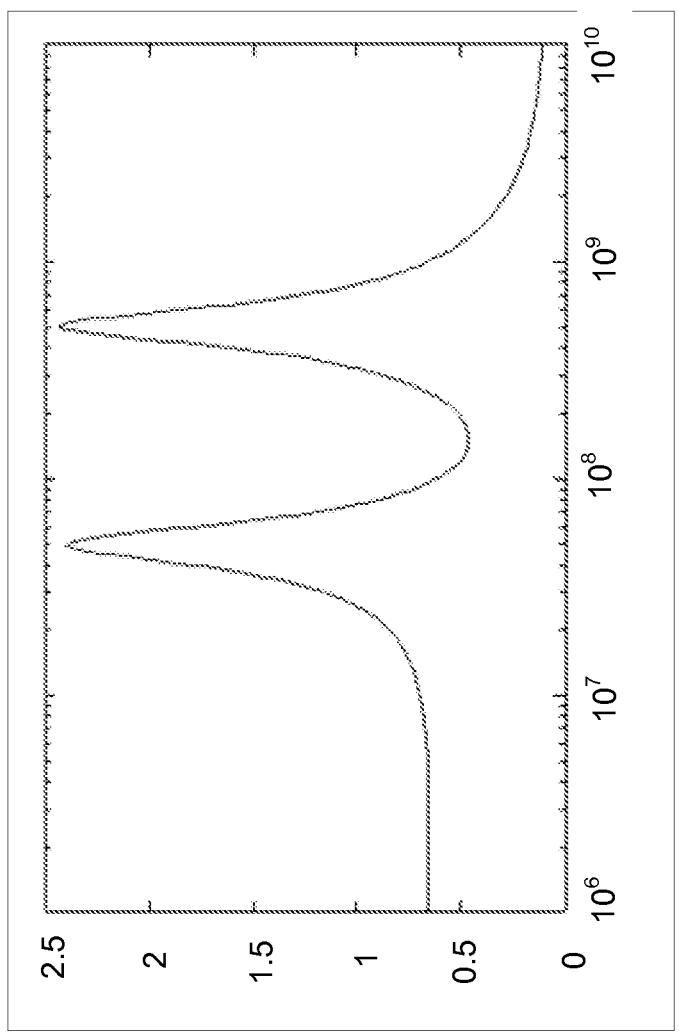
FIG. 6C illustrates a frequency spectrum for a PDN having multiple resonance peaks.

FIG. 6A is a block diagram illustrating elements of a multiple frequency response embodiment of a detector and encoder. Data system 601 comprises detector 615 and encoder 550. This embodiment is similar to the embodiment of FIG. 5A. However, this detector 615 includes an additional filter portion not shown in FIG. 5A and a modified encode set element 663. An example of the modified encode set element 663 is shown in FIG. 6B and will be discussed later. The additional filter portion is illustrated at the bottom of FIG. 6A and includes amplification element 642, amplification element 643, adder 624, adder 661, delay element 633, and delay element 634. The additional filter portion permits detector 615 to detect additional frequencies. For example, such a detector may be appropriate to a power delivery circuit that has multiple resonant frequencies so that encoding may be implemented to avoid multiple resonant frequencies. For example, the filter portions of data system 601 may be set to detect frequencies represented by the frequency peaks illustrated in FIG. 6C. The graph of FIG. 6C show an example frequency response of a power delivery network that has more than a single resonant frequency. While the embodiment of FIG. 6A implements two filter portions, additional filter portions may be added depending on the desired frequency response of the detector.

One example of encode set element 663 is illustrated in FIG. 6B. Encode set element 663 comprises comparator 674, comparator 675, comparator 676, and logic block 678. The aggregate bus weight signal SDQP is applied to first comparator 674 in the encode set element 670. Comparator 674 may be configured to compare the signal with a threshold (shown as "Threshold AA") to assess whether coding is necessary. For example, for a DBI_DC encoding scheme, the threshold comparison may indicate inversion if the weight of the signal exceeds a desired weight (e.g., a threshold indicative of 50% of the potential aggregate current of the bus). The output signal (shown as "a*D1+b*D2" in FIGS. 6A and 6B) of the first filter of detector 615 is applied to comparator 676. This output signal and also compared with a threshold (shown as "Threshold BA"). Threshold BA may be the same or different from threshold AA and may depend on the gain attributable to the amplification elements of the filter. The output signal (shown as "a2*D1+b2*D2" in FIGS. 6A and 6B) of the second filter of detector 615 is applied to comparator 675. This output signal is compared with a threshold (shown as "Threshold CA"). Threshold CA may be the same or different from threshold AA and/or threshold BA and may depend on the gain attributable to the amplification elements of the filter. Although analog comparators are illustrated in the example encode set element 663 of FIG. 6A, it may also optionally be implemented with digital components such as digital magnitude comparators.

The output of comparators 674, 675 and 676 are then applied to logic block 678 to set an encoding control signal, or signals, as a function of the outputs of comparators 674, 675 and 676. For example, depending on the output of the filter, if encoding is needed for the next transfer, one or more outputs of logic block 678 may be set high. If encoding is not needed, the outputs of logic block 678 may be set low.

Figure 7A:
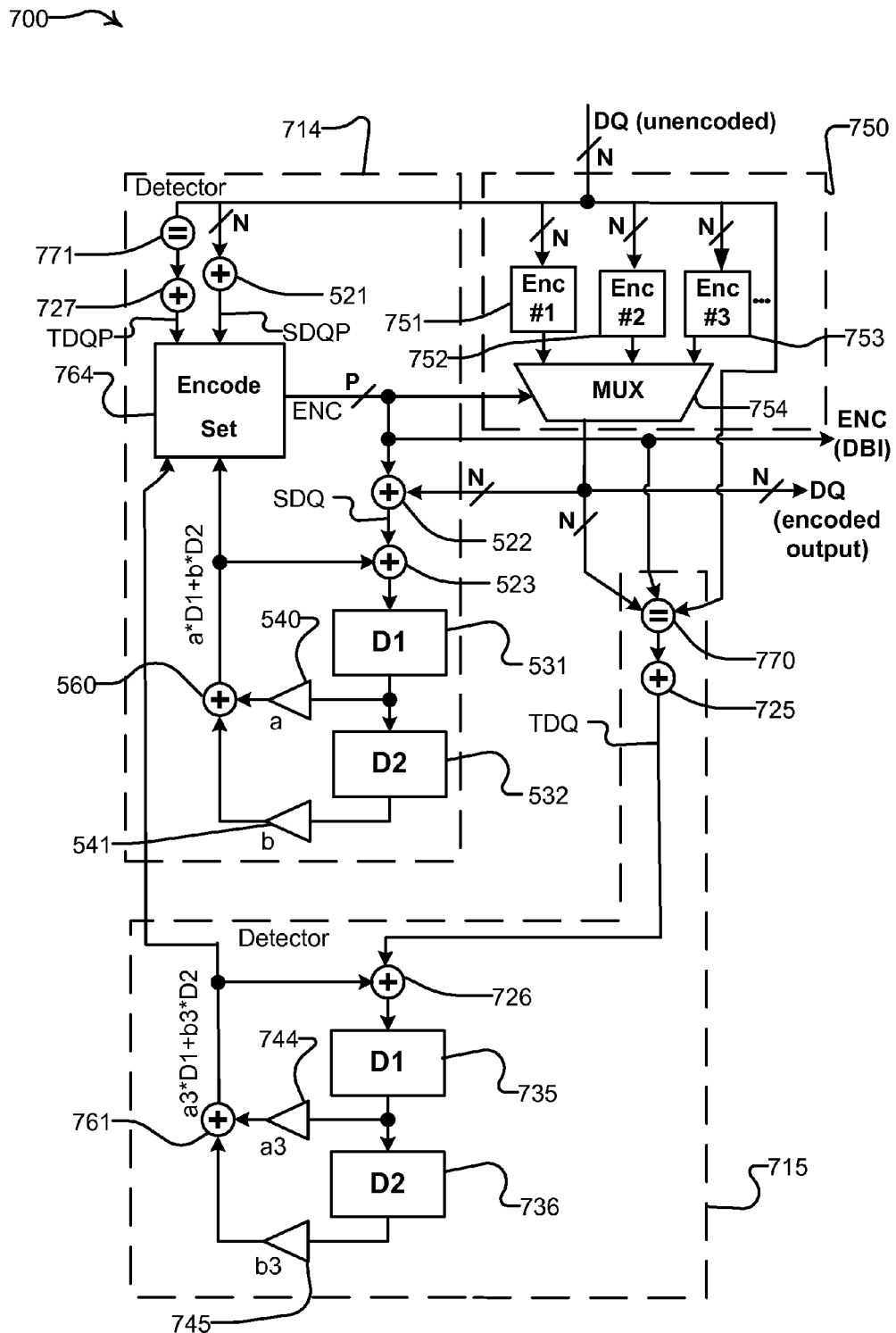
FIG. 7A is a block diagram illustrating a data system and a frequency-based detector and encoder.

FIG. 7A is a block diagram illustrating a data system and a frequency response detector and encoder. Data system 700 comprises detector 714, detector 715, and encode select element 750. Detector 714 includes one or more delay elements 531, 532 (also shown as "D1" and "D2" respectively in FIG. 7A), one or more amplification elements 540, 541 (also shown as "a" and "b" respectively in FIG. 7A), one or more adders 521, 522, 523, 560 and encode set element 564. The filter portion of detector 714 generally may be viewed as including amplification element 540, amplification element 541, delay element 531, delay element 532, adder 560, and adder 523. Thus, in this embodiment, these elements of the filter portion provide a filtering function as previously described. Likewise, adders 521 and 522 sum the data signals of the bus and the encoding control signal(s) to generate sums that represent the aggregate current of the bus.

Encode select element 750 will typically be configured to modify the incoming unencoded data (shown as "DQ unencoded" in FIG. 7A) so that an aggregate bus weight signal (labeled "SDQ" in FIG. 7A) may be generated to represent the weight that was actually transmitted on the bus. For example, encoder 751 may apply bus inversion. Encoder 752 may be a delay element that provides no inversion. Encoder 753 may apply an XOR against a predetermined set of mask bits, sequence of mask bits, or the last set of transmitted bits. The multiplexer 754 then passes the appropriate signals (inverted, XOR'd, neither, or otherwise encoded) based on the encoding control signals applied to the multiplexer 754 from the encode set element 764. In some embodiments, the encode select element 750 may share components of the encoder or decoder of the system since they provide similar functions.

Detector 714 includes digital comparator 771 and adder 727. Digital comparator 771 determines the number of bits that will change state between unit intervals. Adder 727 sums this number of toggling bits for use as an input to encode set element 764. The output of adder 727 corresponds to an incoming aggregate switching weight signal TDQP.

Detector 715 includes digital comparator 770 and adder 725. Digital comparator 770 determines the number of bits that have changed state between unit intervals. Adder 725 sums this number of toggling bits for use as an input to the filter function of detector 715. The output of adder 725 corresponds to an incoming aggregate switching weight signal TDQ. Thus, TDQ is input to summer 726. Historical aggregate switching weight information is maintained in the delay elements 735 and 736 of the filter portion of the detector 715.

The output of detector 715 allows a switching frequency-based bus encoding control determination to be made. As will be explained in more detail herein with respect to FIG. 7B, the encode set element 764 may include one or more comparators configured to make the encoding decision.

The output signal of the adder 725 is input to a second adder 726. This adds the new aggregate switching weight signal to the output signal of the filter (shown as "a3*D1+b3*D2" in FIG. 7A). The output of the adder 726 is applied to a first delay element 735 (D1). The first delay element may typically include a register or other data store or latch element to hold the input value for at least one unit interval. Output of the first delay element 735 is applied to the second delay element and to first amplification element 744. The second delay element may also typically include a register or other data store or latch element to hold the input value for at least one unit interval. The first amplification element applies a gain corresponding to a coefficient of the filter such as an "a" coefficient of any of the filter transfer functions previously mentioned.

The output of the second delay element 736 (also shown as D2) is applied to a second amplification element 745. The second amplification element applies a gain corresponding to a coefficient of the filter such as a "b" coefficient of any of the filter transfer functions previously mentioned. The output signals of each of the amplification elements are applied to adder 761. Adder 761 produces the filter output signal (shown in FIG. 7A as "a3*D1+b3*D2"). This signal is input to the encode set element 764. In this embodiment, although two delay elements and two amplification elements are illustrated, additional or fewer such elements may also be implemented in the filter portion depending on the desired filter transfer function or filter transfer functions implemented in detector 715 based on the designed frequency response of the filter of detector 715.

Figure 7B:
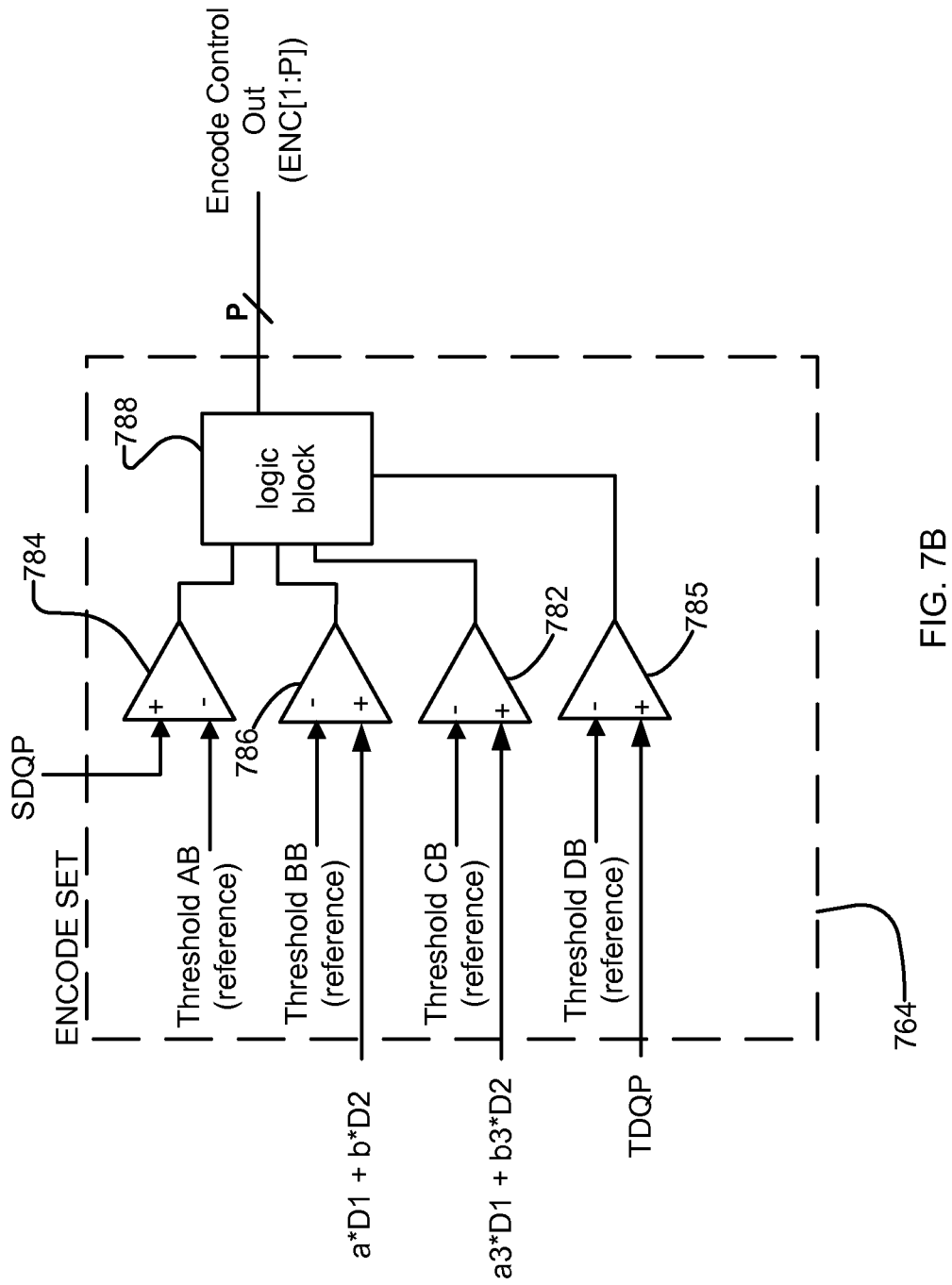
FIG. 7B is a block diagram showing elements of an encoding set or decision element of the detector and encoder illustrated in FIG. 7A.

One example of an encode set element 764 of FIG. 7A is illustrated in FIG. 7B. The aggregate bus weight signal SDQ is applied to comparator 784 in the encode set element 780. Comparator 784 may be configured to compare the signal with a threshold (shown as "Threshold AB") to assess whether particular coding is necessary. For example, for a DBI_DC encoding scheme the threshold comparison may indicate inversion if the weight of the signal exceeds a desired weight (e.g., a threshold indicative of 50% of the potential aggregate current of the bus).

The aggregate switching weight signal TDQP is applied to comparator 785 in encode set element 780. Comparator 785 may be configured to compare the signal with a threshold (shown as "Threshold DB") to assess whether a particular coding is necessary. For example, for a DBI_AC encoding scheme, the threshold comparison may indicate inversion if the switching weight of the signal exceeds a desired weight (e.g., a threshold indicative that 50% or more the bus lines will switch states).

The output signal (shown as "a*D1+b*D2" in FIGS. 7A and 7B) of the filter portion of detector 714 is applied to comparator 786. Comparator 786 compares this signal with a threshold (shown as "Threshold BB"). Threshold BB may be the same or different from threshold AB and/or threshold DB and may depend on the gain attributable to the amplification elements of the filter.

The output signal (shown as "a3*D1+b3*D2" in FIGS. 7A and 7B) of the filter portion of detector 715 is applied to comparator 782. Comparator 782 compares this signal with a threshold (shown as "Threshold CB"). Threshold CB may be the same or different from threshold AB and/or BB, and/or DB, and may depend on the gain attributable to the amplification elements of the filter. This comparison of comparator 782 essentially effects the subtraction of the filter polynomial (e.g., 1−a3*D1+b3*D2) in the denominator of the filter transfer function previously described. Although analog comparators are illustrated in the example encode set element 764 of FIG. 7B, it may also optionally be implemented with digital components such as digital magnitude comparators.

The output of comparators 782, 784, 785, and 786 may then be applied to logic block 788, to set encoding control signal(s) as a function of the outputs of the comparators. Logic block 788 is shown with P output signals. For example, depending on the output of the filter, if encoding is needed for the next transfer, the logic block 788 may set one or more of its outputs high depending upon a type of encoding to be applied. If encoding is not needed, the logic gate may set all of its outputs low.

The aggregate switching weight is predicted in one or more summers by at least summing the number of toggling data bits of the data signals to be transmitted to the bus. This produces the aggregate switching weight signal TDQP. Typically, the summing operation may be based on summing all or some of the toggling signals of the bus for a given unit interval of a data clock of the system. As discussed previously, in some systems, data of a common system clock unit interval may be transmitted onto the channels of the bus utilizing independent transmit clocks where the transmit clocks are not necessarily precisely in phase with each other. In such a system, the determination of the aggregate switching weight of the bus may compensate for the delay of certain data entering the bus with the different phases of the transmit clocks as described previously. Thus, the filter of detector 715 may accurately predict the switching current or energy status of predriver PDN in the case of signal skew between different lines of the bus.

Figure 8A:
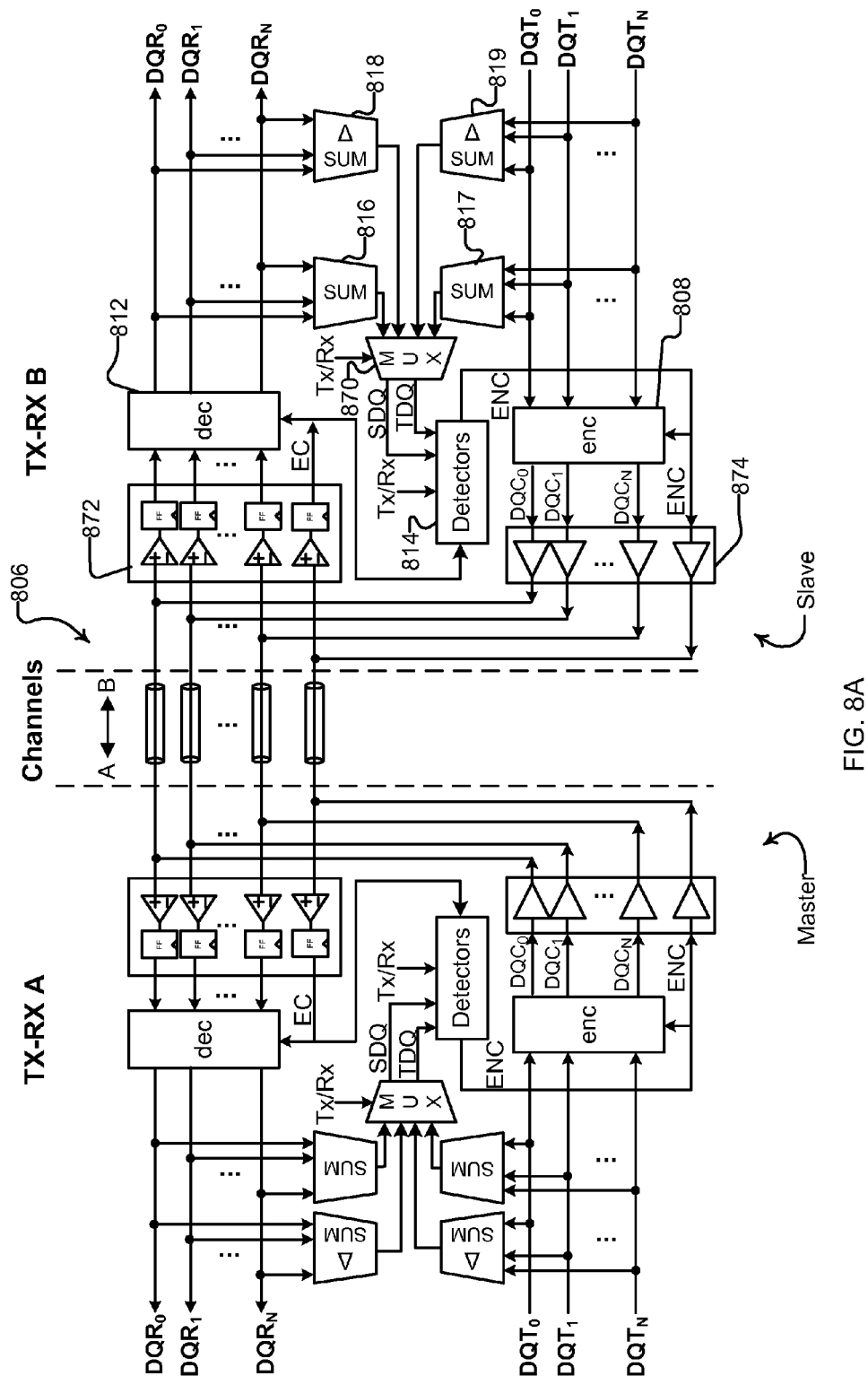
FIG. 8A is a block diagram illustrating a bidirectional bus embodiment of the present frequency-based bus coding technology, including a detector for each one of two transceivers.

FIG. 8A illustrates a data system embodiment that implements frequency-based bus encoding of the present technology for a bidirectional bus. In this embodiment, detectors 714 may exist at opposite sides of the channels. Moreover, transceivers (shown as "TX-RX A" or "TX-RX B") may be implemented on opposing sides of the channels. In this embodiment, the history of the filters of each detector 814 may evaluate aggregate current in the bus 806, or switching current in predrivers or other internal circuitry, from data of one or more unit intervals from a prior transmission, even if the detector 814 is operating in a receive mode. Similarly, the history of the filters of each detector 814 may evaluate aggregate current in the bus, or switching current in predrivers or other internal circuitry, from data of one or more unit intervals from a prior reception even if the detector 814 is operating in a transmit mode. In other words, the history of current on the bus 806, or the history of switching current in predrivers or other internal circuitry, can be maintained in each detector 814 for at least a time period of several unit intervals of data from the bus 806.

The several unit intervals may include data representative of current driven by drivers (or switching current in predrivers or other internal circuitry) from both sides of the channel such as when a transmission from one side of the channel to the other side of the channel (e.g., A to B directional arrow shown in FIG. 8A) successively changes to a transmission from the other side of the channel back to the original side of the channel (e.g., B to A directional arrow shown in FIG. 8A). These transceivers may be configured to operate in a half-duplex bidirectional mode or they may be configured to operate in a full-duplex bidirectional mode. In either case, the filters of the detectors 814 would be supplied with aggregate bus current data, or switching current in predrivers or other internal circuitry, from the receive and transmit operations so that a respective filter may operate based on the history of the bus 806 from both receiving and transmitting operations.

In the embodiment of the data system of FIG. 8A, each transceiver is configured with similar elements. Moreover, each may also include receiver or transmitter elements to operate like the previously discussed embodiments. Thus, transceiver TX-RX B will have transmitter components including a block of drivers 874. The block of drivers 874 drive control information and/or data onto the bus 806. Encoder 808 encodes transmissions by a data bus inversion or other encoding scheme under the control of detectors 814. Detectors 814 make a frequency-based decision based on the aggregate bus weight signal SDQ and the aggregate switching weight TDQ. To this end, data to be transmitted is summed in summer 817 to determine an aggregate bus weight signal SDQ. Likewise, the changing data bits to be transmitted is summed in summer 819 to determine an aggregate switching weight signal TDQ. In this embodiment, the sum from the summer 817 and the sum from summer 819 are applied to a multiplexer 870 and will advance detectors 814 depending on the mode of the transceiver TX-RX B indicated by a transceiver mode signal (shown as Tx/Rx in FIG. 8A). If the transceiver mode signal indicates that the transceiver TX-RX B is transmitting data onto the bus 806, then the multiplexer 870 will permit the SDQ from summer 817, and TDQ from summer 819, to be input to the detectors 814 so that detectors 814 will evaluate data to be transmitted while in the transmit mode.

Transceiver TX-RX B also includes receiver elements. Thus, the transceiver includes a block of slicers 872 or similar sampling elements to sense the signals from the channels of the bus 806. The transceiver will also include a decoder 812 to decode data that has been received from the bus in encoded form. Decoder 812 decodes data based on the control of the encoding control (ENC) signal received from the bus 806. Received signals from the bus that have been decoded by decoder 812 are summed in summer 816 to generate an aggregate bus weight signal. Likewise, the received signals that have changed from the bus that have been decoded by decoder 812 are summed in summer 818 to generate an aggregate switching weight signal. If the transceiver mode signal indicates that the transceiver TX-RX B is receiving data from the bus 806, then the multiplexer 870 will permit the SDQ from summer 816, and the TDQ from summer 818, to be input to detectors 814 so that the detectors can evaluate received data while in the receive mode.

Optionally, while the aggregate bus weight signals and/or the aggregate switching weight signals are supplied to the detector 814 based on received data or transmit data as just described, the detector 814 may also be configured for an idle mode. In an idle mode, the transceiver is not operating to transmit data or receive data. During this time, the signals of the bus may have some idle value. An additional summer component (not shown) may be implemented to provide an SDQ and/or TDQ signal for the idle mode to the detector. In such an embodiment, the SDQ entering detector 814 during the idle mode may represent the aggregate current of the bus by summing the idle values of the bus 806. The TDQ entering detector 814 during the idle mode may represent the aggregate switching current of bus 806, predrivers, or other internal circuitry by summing changes in the idle values of the bus 806. In this way, the history of the filter of the detector may more accurately represent the history of bus 806.

For example, during an idle period, the transceivers of the bus 806 may transmit "dummy" or "dead" data. This could be handled by using a mask signal when transmitting from a transceiver on one device such as on a controller to a transceiver on another device such as a memory or DRAM. This dummy or dead data may be easily ignored when transmitting from the memory or DRAM to the controller since the controller determines which periods are idle. Alternatively, the controller could issue a command over the command and address bus to let the DRAM or receiving element know what data to ignore. By permitting the idle period data to enter the filter and allowing the resulting signals to be transmitted on the bus 806 can help to avoid step changes in operation that could induce very large switching noise.

Also, during long idle periods, the controller may optionally be configured to filter a particular number of periods of the transmitted idle data, and then gradually reduce the aggregate signaling current of the bus 806 by slowly setting transmitters to a low-power IDLE mode in a manner that is aware of the frequency response of the system. Essentially, a post-amble may be implemented for this purpose that is based on a frequency aware encoding scheme.

Optionally, the controller may also be configured to gradually ramp up to a specified operating condition for the bus 806 at the end of an idle period to reduce initial condition transients. Essentially, a pre-amble may be implemented to accomplish this based on the frequency aware encoding scheme.

Figure 8B:
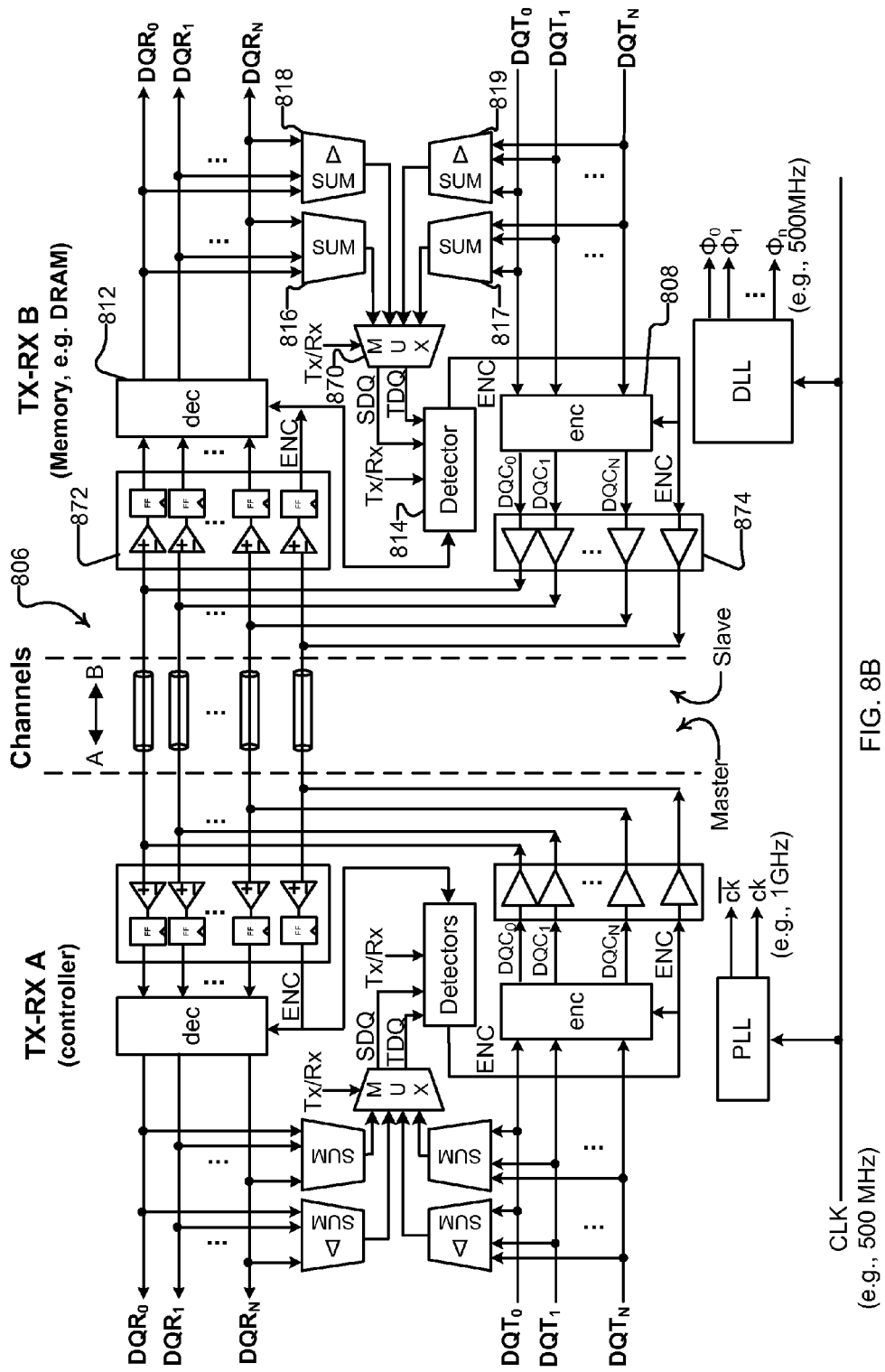
FIG. 8B is a block diagram illustrating a bidirectional mesochronous memory system embodiment based on the components of FIG. 8A.
Figure 8C:
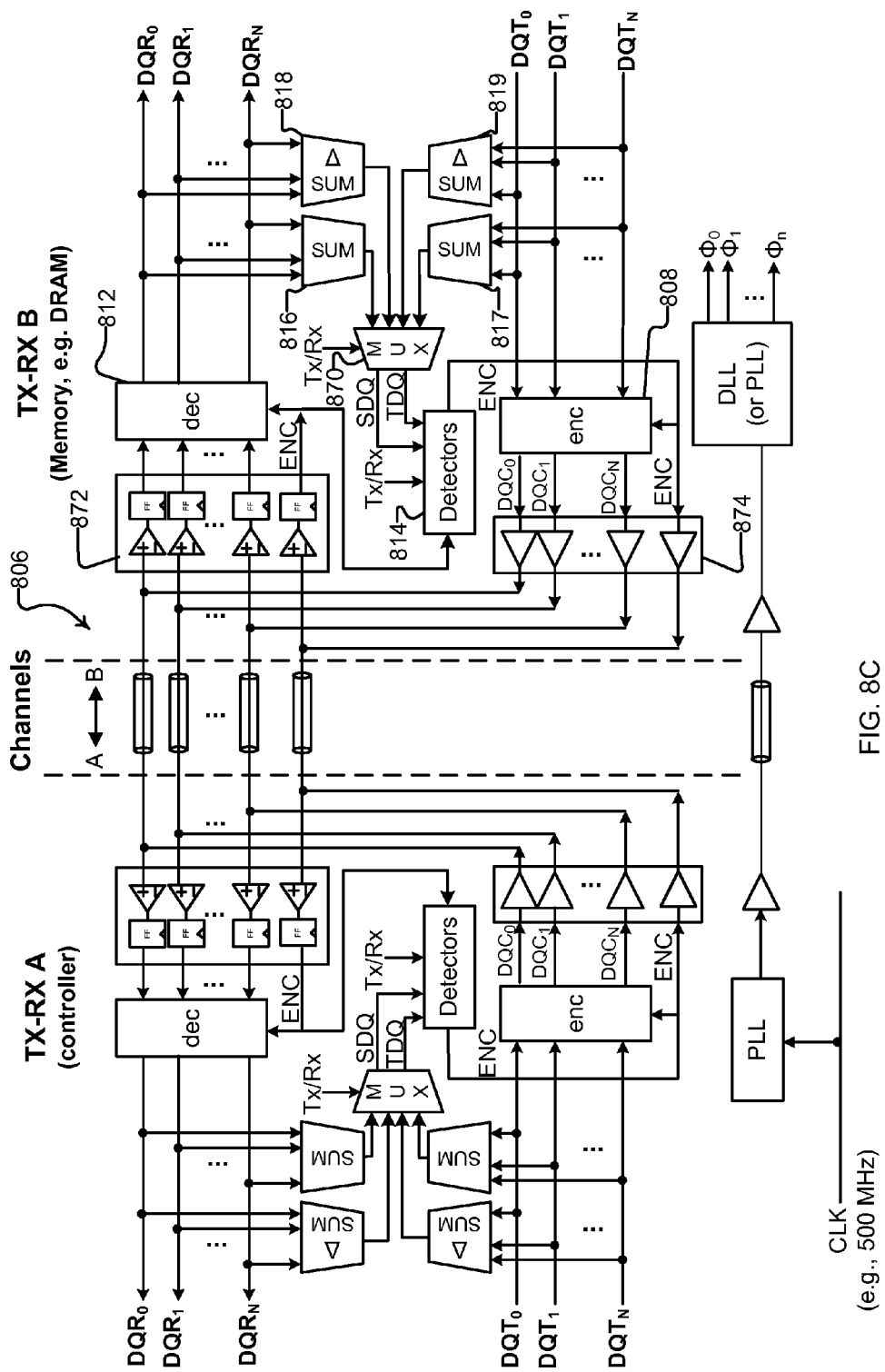
FIG. 8C is a block diagram illustrating a clock forwarding embodiment based on the components of FIGS. 8A and 8B.
Figure 8D:
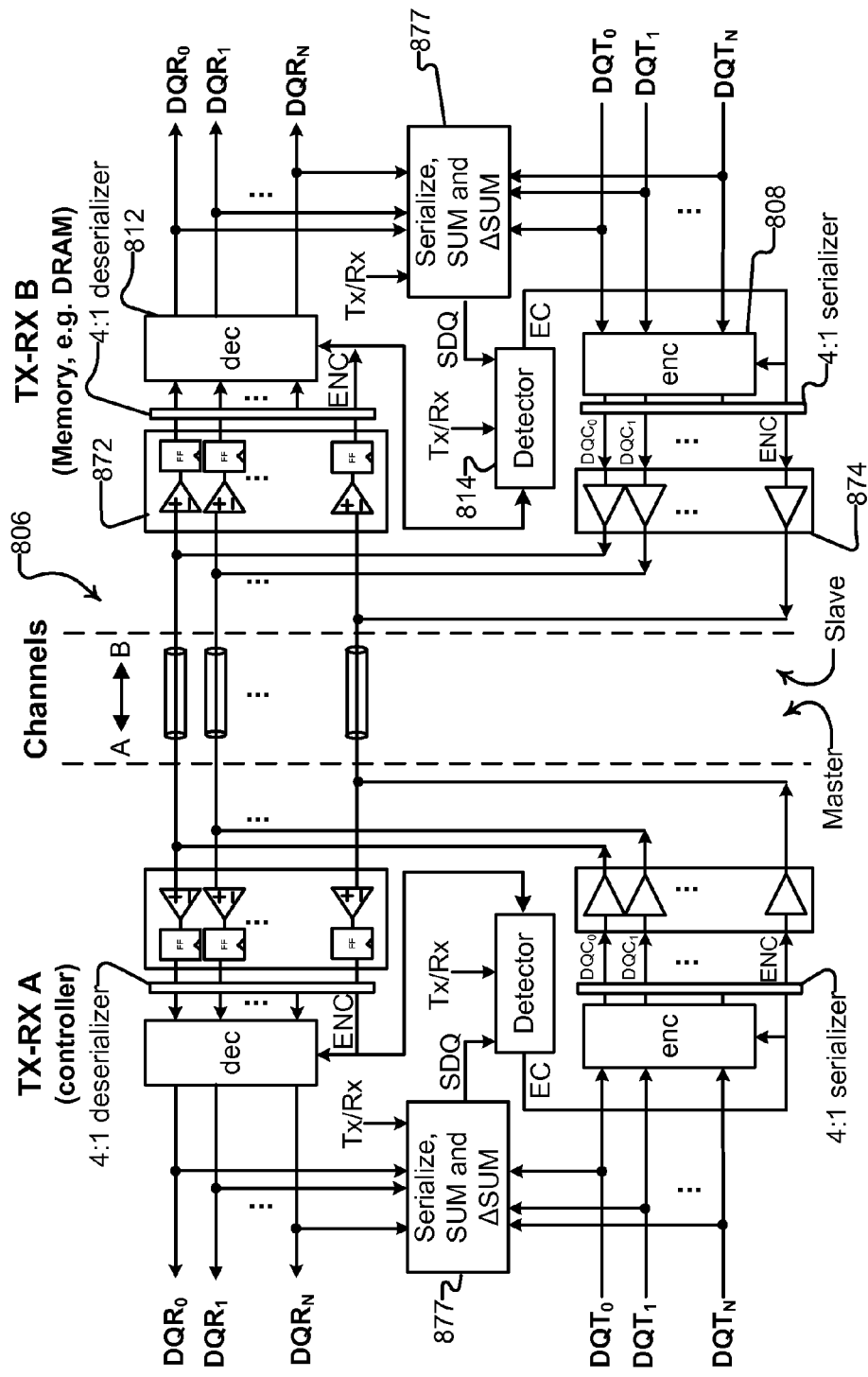
FIG. 8D is a block diagram illustrating a parallel codec embodiment with serializers and deserializers based on the components of FIGS. 8A, 8B, and 8C.

FIGS. 8B, 8C and 8D illustrate various systems based on the components implemented in the embodiment of FIG. 8A. In FIG. 8B, the components are implemented as a mesochronous memory system. As illustrated, the system includes timing components such as a PLL and a DLL. The PLL on the controller side of the bus 806 synchronizes operation of the components on the controller side of the bus. The DLL on a memory side of the bus 806 synchronizes operation of the components on the memory side of the bus. The characteristic frequencies, such as loop bandwidth or other frequencies, associated with the operation of the DLL and PLL may also be designed into the frequency responses of the detectors 814 of the system. Thus, the encoding control of the system may avoid noise associated with these timing components near the characteristic frequencies of these timing components. Similarly, the detectors 814 of the clock forwarding memory system shown in FIG. 8C may also be configured to filter frequency dependent noise associated with its timing components.

The embodiment of FIG. 8D provides a parallel codec. The system employs serializers and deserializers in the transmission of data on the bus 806. For example, for a system that has a data through-put of sixteen bits (i.e., sixteen bit wide processing) per unit interval at the controller or at the memory such that sixteen bits are processed in parallel, the system may transmit the data serially on the bus 806 between the memory and controller. In such a serial transmission example, a four bit wide data bus 806 may be utilized to transmit the sixteen bit data but over the course of four unit intervals on the bus (the unit interval of the controller being four times the unit interval of the bus, in this example). For such a system, the sixteen bits of data would still be processed by a detector 814.

The data to be transmitted on the bus after serialization would be processed in one or more detectors 814 in the manner that would permit encoding control based on serialization scheme of the bits that are transmitted on the bus 806. Thus, in the example, the 16 bits in a detector 814 would be summed four bits at a time and processed by the detector 814 in the order and timing that that each group of four bits would be transmitted on the bus 806. These groups would also be examined for changing bits and processed by the detector 814. This may be accomplished by additional components in the system.

For example, a serialize, sum, and change sum element 877 may be implemented. Such an element would perform the functions of summers 816, 817, 818, 819 and multiplexer 870 but with fewer bits in each unit interval based on a serialization of data by a serializer internal to serialize, sum, and change sum element that operates according to the transmission scheme of the bus 806. In such a case, a detector 814 may operate at the clock rate of the bus. Other components may be utilized to implement the input of data to one or more detectors 814 in the serialized manner that it is transmitted on the bus 806.

Figure 9:
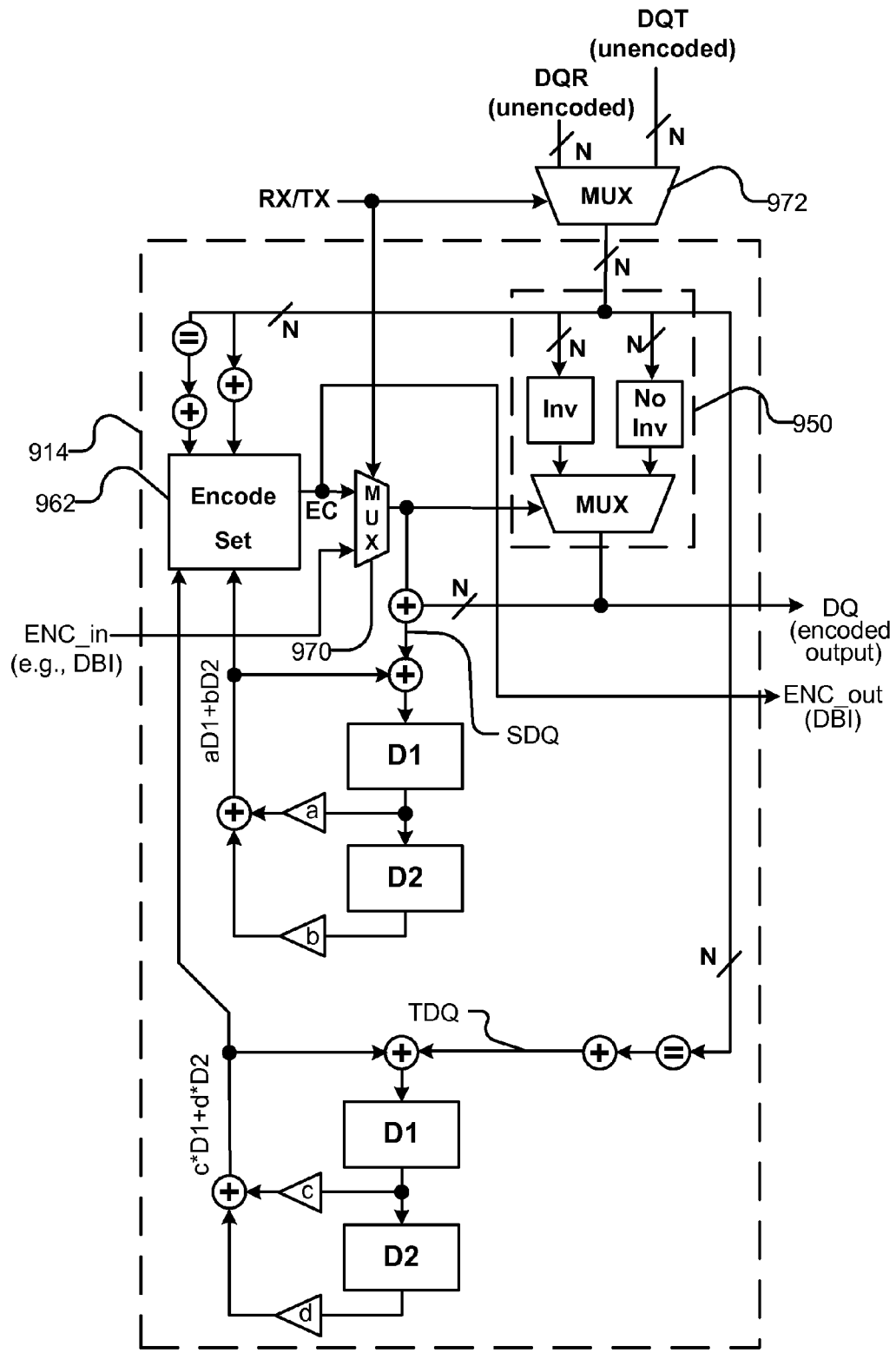
FIG. 9 is a block diagram of an example detector that may be suitable for implementation with the bidirectional bus embodiments of FIGS. 8A, 8B, 8C, and 8D.

FIG. 9 illustrates an example detector 914 that is suitable for use in a transceiver in the embodiment of FIGS. 8A, 8B, 8C, and 8D. Although, in this embodiment, the detector 914 includes components for deriving the sum of the aggregate current of the bus (e.g., SDQ) and the sum of the aggregate switching signals (e.g., TDQ). The detector 914 includes elements that have an operation comparable to that of the detector illustrated in FIG. 7A. However, in this embodiment, a multiplexer 970 is added so that the detector may selectively utilize an appropriate encoding control signal depending on the mode of the transceiver. To this end, the multiplexer 970 is controlled by the transmit or receive mode signal (shown as RX/TX in FIG. 9) like that of FIGS. 8A, 8B, 8C, and 8D. The output of the multiplexer 970 permits the incoming unencoded data signals to be modified in the invert/pass element 950 depending on whether transceiver A or transceiver B transmitted the data on the bus. Thus, if the transceiver with the detector is in transmit mode, the multiplexer 970 will utilize the encoding control signal from the encode set element of these detectors 914. However, if the transceiver is in receive mode, the multiplexer 970 will utilize the encoding control signal (shown as "ENC_in") that was received from the bus and generated from an encode set element from another detector (not shown in FIG. 9) on an opposite side of the bus. Thus, the output of the invert/pass element 950 will permit the aggregate bus weight signal to reflect the aggregate weight of the bus before being applied to the history of the filter. Likewise, the output of the invert/pass element 950 will permit the aggregate switching weight signal to reflect the aggregate switching weight before being applied to the history of the filter. Moreover, the aggregate weight and aggregate switching weight will reflect the data being transmitted or the data being received depending on the transmit or receive mode of the transceiver.

In addition, in this embodiment, a multiplexer 972 may also be implemented to apply either the unencoded received data signals (shown as DQR) or the unencoded transmit data signals DQT to invert/pass element 950 depending on the mode of the transceiver. To this end, the transmit or receive mode signal RX/TX controls the multiplexer 972. Thus, the unencoded received data signals DQR may be applied to the history of the filter portion of the detector when the transceiver is in a receive mode. Similarly, the unencoded transmit data signals DQT may be applied to the history of the filter portion of the detector when the transceiver is in a transmit mode. Alternatively, in the event that the transceiver is configured for full duplex operations, the multiplexer 972 would not be necessary. Rather, both the unencoded received data signals DQR and the unencoded transmitted data signals DQT would be encoded based on their respective encoding control signals. These encoded data signals would then be jointly summed and applied to the history of the filter portion of the detector. In this event, the transmit or receive mode signal RX/TX would not be necessary.

Figure 10:
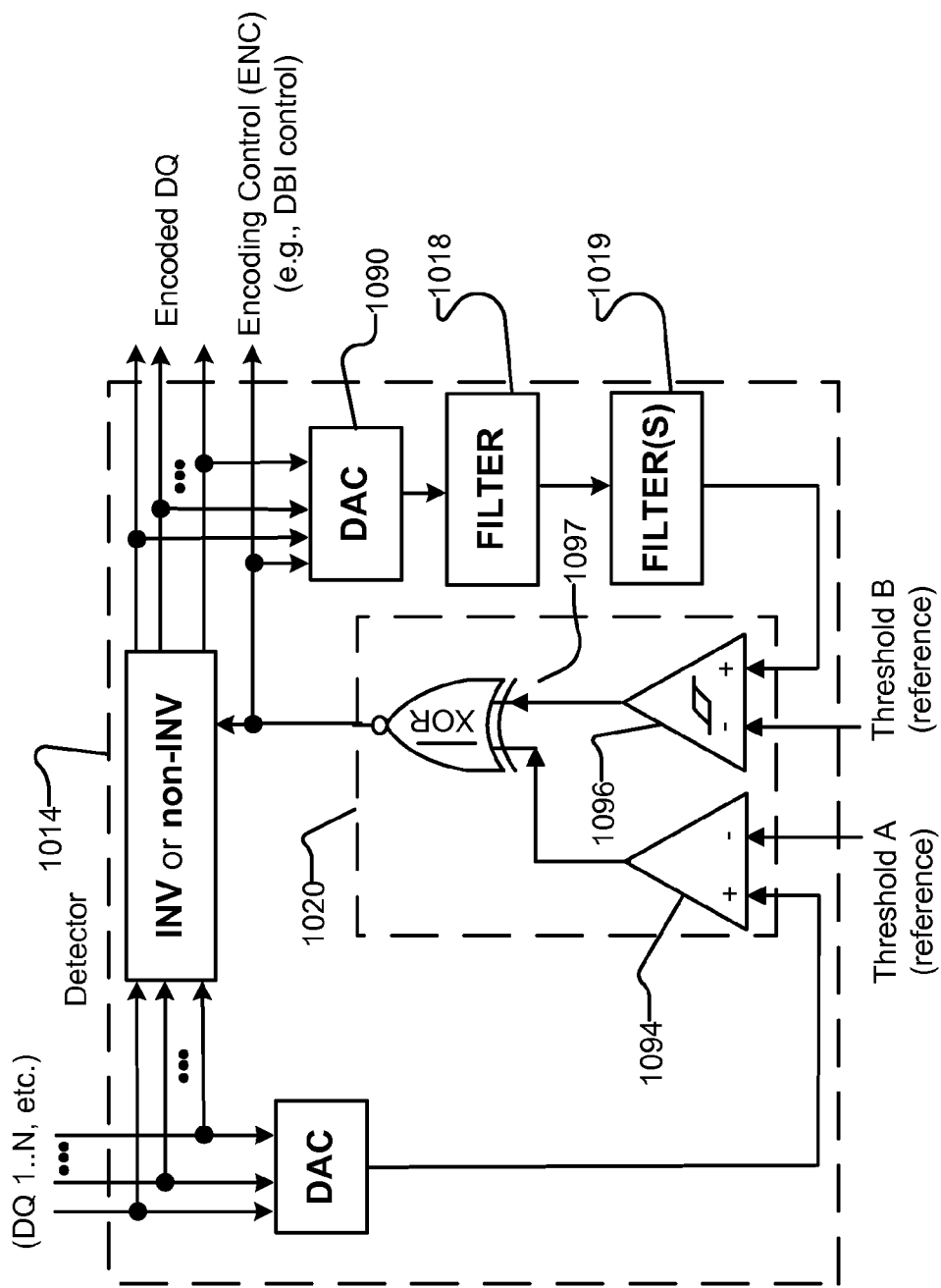
FIG. 10 is a block diagram of another example detector, namely, one having an analog filter.

FIG. 10 shows an exemplary detector that uses an analog filter. The analog filters of this detector are collectively configured to produce a frequency response for setting the encoding control as previously discussed. Thus, the filters may be implemented according to the exemplary transfer function(s) previously described. The detector includes a digital-to-analog converter 1090 (DAC) and encode set element 1020. In this embodiment, the DAC effectively sums the signals applied to the DAC and converts them to an analog output signal, either voltage or current, that represents the aggregate current of the bus. The output of the DAC is then optionally applied to a filter 1018. In this embodiment, the filter may be a low-pass filter or low-pass ripple filter. This filter may, for example, be a resistor-capacitor filter. In such an embodiment, the low-pass filter may have a cutoff frequency that is sufficiently low to remove ripple from any high-frequency switching of the system. This may be useful in the event that an active analog block will subsequently process the filtered sum signal. For example, a cutoff frequency of Fs/2 may be reasonable where Fs is the data rate of the digital data of the system. This may be set at design time. However, the cutoff frequency should typically be set high enough to avoid interfering with the frequency band that the system is being designed to avoid.

In another embodiment, filter 1018 may be a high-pass filter. In such an embodiment, the high-pass filter may have a cutoff frequency that is sufficiently high to only capture switching frequencies from the high-frequency switching of the system. Thus, the output of filter 1018 would represent the toggling of the signals on the bus.

The output of filter 1018 is then applied to another filter or filters 1019. This set of filters is designed to remove energy in the desirable frequency band(s) and allow energy in the undesirable frequency band(s) to pass. This removal of energy tailors the output of the filters so that the set of filters senses/detects energy in the undesired band(s) to then make an encoding decision in response to its detection. The filters may be passive and/or active. Active filters could be continuous time filters using amplifiers (e.g., Vg, Ig Gm, etc.). Active filters could also be switched capacitor based, such as a low-Q biquad filter, high-Q biquad filter, etc. As previously discussed, the filter(s) may even be implemented with a programmable bandwidth/frequency response, quality factor ("Q"), etc. so that the filter may be set dynamically depending on changes in the PDN such as due to dynamic on die termination changes or the failure of a bypass capacitor on the system main board.

The output of filter(s) 1019 is applied to invert set element 1020 which is similar to the invert set element of prior embodiments. This element includes comparators, such as a Schmitt Trigger. The Schmitt Trigger comparator 1096 compares the output of filter 1019 to a threshold such as a voltage reference. This operation is comparable to the function of comparator 566 of FIG. 5B as previously described. The comparator 1096 may apply hysteresis to reduce sensitivity to noise, which might otherwise cause glitches. For example, when the strength of the output of filter(s) 1019 exceeds the threshold, the comparator 1096 produces a true level (e.g., "1" or high). Otherwise the comparator 1096 may produce a false level (e.g., "0" or low). Another comparator 1094 compares an aggregate current signal SDQ to a threshold like the comparator 564 of FIG. 5B.

The output of the comparators are then added in adder 1097. The sum is then applied to the sampler 1092. The sampler 1092 samples the sum of the comparator outputs at times associated with a clock signal that may have a frequency and phase of the data rate clock of the system such that its encoding control signal output corresponds with each unit interval for data driven to the bus.

Figure 11:
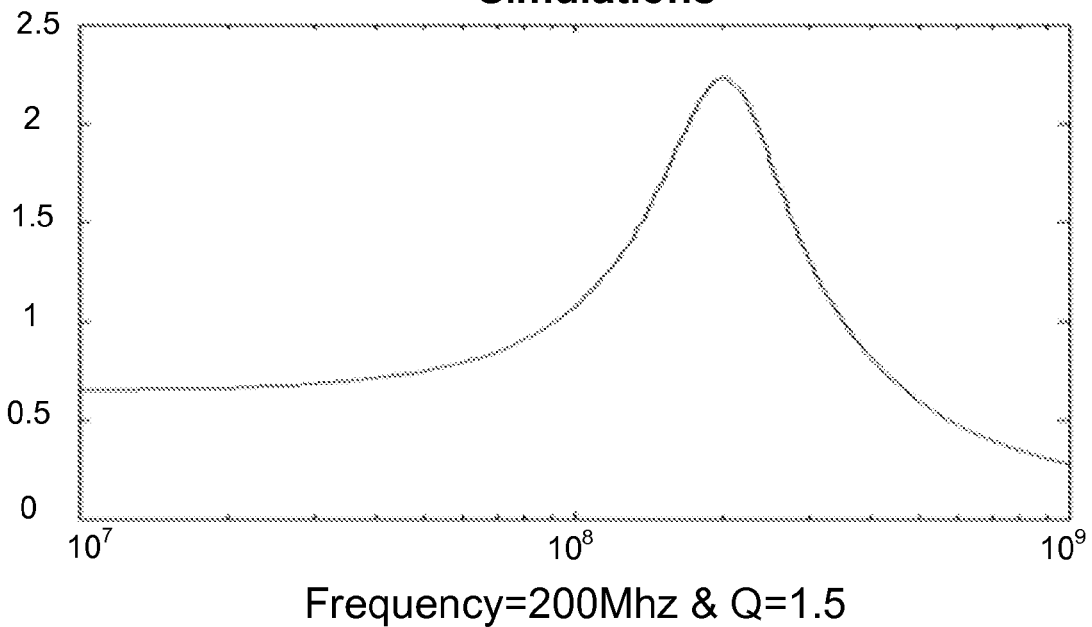
FIG. 11 is a graph of an example bus impedance function showing a simulated resonance that was used for comparing technologies in the simulations graphed in FIGS. 12A and 12B.

For the simulation, a model for the power delivery network was fit to an impedance curve illustrated in FIG. 11. The elements in this model were then scaled by a factor of 5× to account for the fact that it was being excited by only a single byte width of drivers rather than four bytes width of drivers plus command and address drivers. This model utilized a Q=1.5 and resonance frequency of 200 MHz.

A simulated performance of a digital filter embodiment of the present frequency-based bus encoding technology compared to other conventional technologies is illustrated in the graphs of FIGS. 12A and 12B. The simulated performance of the present technology (labeled as "Filter" in FIGS. 12A and 12B) was compared to simulated performances of a data system that does not implement any bus coding (i.e., no coding) (labeled as "normal" in FIGS. 12A and 12B). The simulated performance of the present technology was also compared to a simulated data system that utilizes a conventional low-weight encoding technique (labeled in FIGS. 12A and 12B as "DBI_DC"). A Matlab simulator was used. The Matlab simulation results show that an embodiment of the present frequency-based bus encoding technology may be capable of providing more than twice the performance enhancement that a conventional bus inversion encoding technique may provide.

As shown in FIG. 12A, the performance of the "Normal" operating bus and the "DBI_DC" operating bus were compared to an example data system of the present technology using a 3-Tap IIR filter having an Fs of 5 GHz filter. A second comparison of the "Normal" operating bus and the "DBI_DC" operating bus against an example data system of the present technology using a 4-Tap IIR filter having an Fs of 2.5 GHz was made. This comparison is illustrated in the drawing of FIG. 12B. The bus current spectrums and the induced power delivery network voltage spectrums of each system were compared. The operation of each system was based on 5 Gbps 8-bit wide PRBS data bus patterns that were 16383 bits in length. The aggregate weight of the simulated current of the bus also included the weight of an encoding control bit determined by the simulated detector.

During the simulations illustrated in FIGS. 12A and 12B, the peak-to-peak induced voltage was observed and used a comparison metric. In addition, the average power consumption for each case was recorded. Another metric of interest was the encoding latency of the various encoding methods. The DBI_DC encoding system requires at least 1 full-rate cycle for encoding. The frequency-based encoding system of the present technology has a similar latency since it evaluates the weight of the current state to compare with the accumulated history of the weights of the current to make a decision about encoding the data. Table I, below, compares some performance metrics for the simulated systems.

TABLE I

| | Bus Induced Voltage on PDN | Bus Average Current Consumption | Encoding Latency |
|---|---|---|---|
| No Coding | 137 mV (0 dB) | 72 mA (0%) | 0 |
| DBI_DC Encoding | 96 mV (−3.1 dB) | 59 mA (−18%) | 1 cycle |
| 3-Tap Filter Encoding @ Fs | 66 mV (−6.3 dB) | 76 mA (+5.6%) | 1 cycle |
| 4-Tap Filter Encoding @ Fs/2 | 57 mV (−7.2 dB) | 74 mA (+2.8%) | 1 cycle |

As illustrated in the graphs of FIGS. 12A, 12B, and Table I, a potential benefit of one application of an example embodiment of the present technology is a reduction of the induced voltage at or about a frequency associated with a resonant frequency of the power delivery network.

Figure 13:
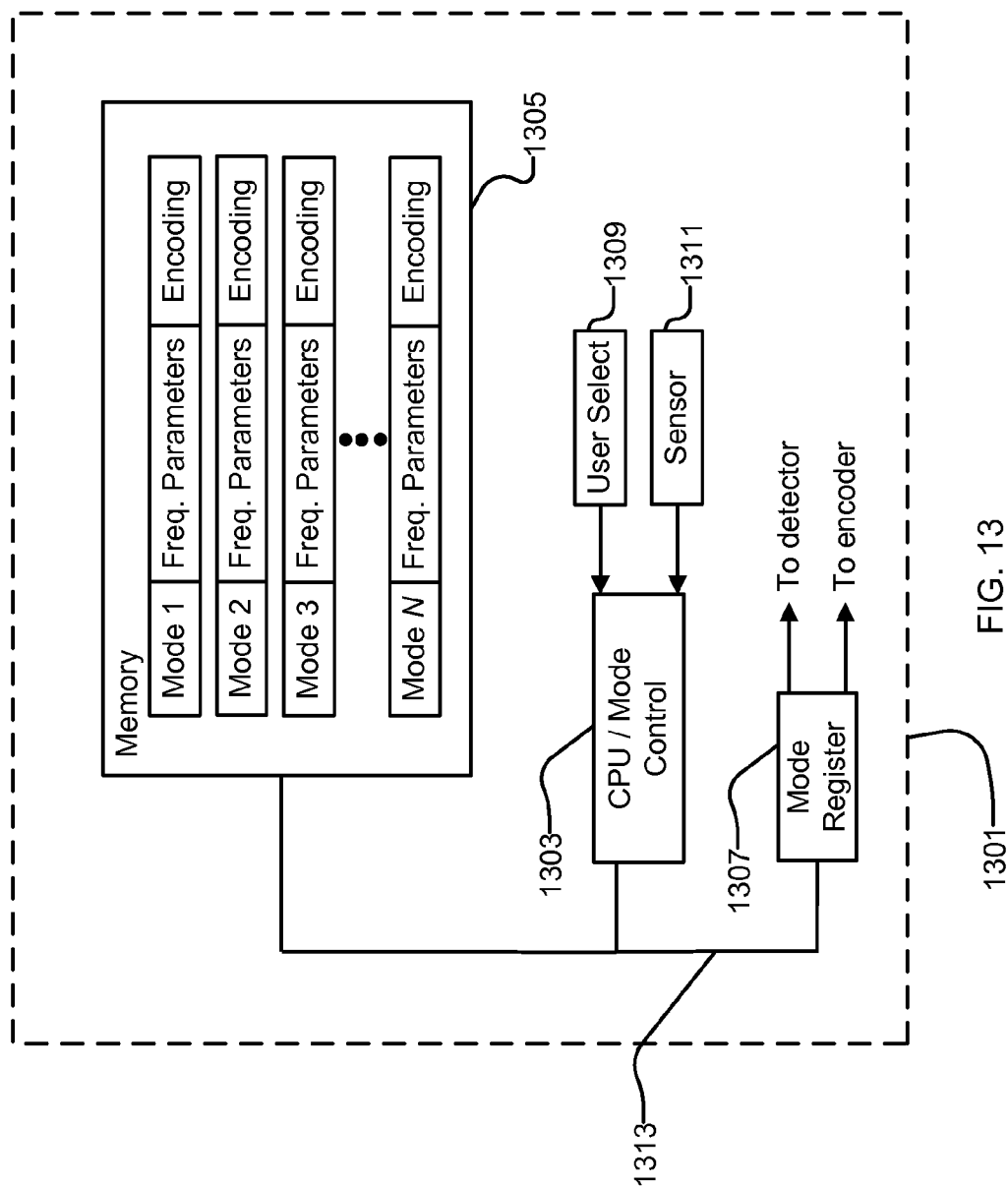
FIG. 13 illustrates a register used to store parameters for different operating modes, for example, that may be used by a portable device to adjust encoding to achieve frequency-related objectives in a variety of environments; and, FIG. 14 is a flowchart illustrating a method of selecting an encoding for the signal lines of a bus.

FIG. 13 presents an example of a multi-mode implementation using the aforementioned principles. In particular, a device 1301 (indicated in phantom lines) may be a designed to change encoding to suit different circumstances or environments. To provide one non-limiting example, the device 1301 may be a portable device (such as a cell phone, game or other portable device) in which frequency of internal operations are adjusted to one of several modes. The device 1301 may include a CPU or other controller 1303, a memory 1305 that stores a number of preprogrammed modes, and a mode register 1307 into which one of the modes from the memory 1305 is dynamically loaded during run-time operation.

Applying the example of a portable device, one mode of operation can include applying no frequency encoding at all (in which case the frequency characteristics of a mode, e.g., "mode 1", may be a null set), while a second mode of operation can implement an "airplane mode" (e.g., in which internal bus operations are controlled so as to minimize frequencies which might interfere with aircraft avionics or other equipment). Such a mode may be selected by a user, or may be automatically activated by the device depending upon detected environment. Nearly any number of modes may be provided, as depicted by a number of modes "1" to "N" within the memory 1305. As each mode is selected, corresponding mode number, corresponding frequency parameters and encoding schemes are loaded into the mode register 1307 for use in actively controlling the device; to this effect, the mode register is depicted as having two outputs, a first one provided to the detector(s) (mentioned in connection with embodiments discussed above) and a second one provided to the encoder (as discussed in connection with embodiments above). The frequency parameter information, depicted as part of the preprogrammed parameters for each mode stored in the memory 1305, represent one or more frequencies or frequency bands that are to be detected by the detector, while corresponding encoding information may be used by the encoder to implement a desired encoding scheme upon detection of the associated parameters. Other methodologies and control points may also be employed.

As indicated by the presence of a user select box 1309 and a sensor box 1311 depicted at the lower right of FIG. 13, the CPU or controller 1303 may be driven to change mode in response to a user selection or in response to external stimuli as detected by a sensor (e.g., based on device location or other detected parameters). The memory 1305 and the mode register 1307 may be separate units that are independently controlled by the CPU or controller 1303, or may be controlled as a single function, for example, through the use of a mode control signal 1313 that indicates to the mode register 1307 exactly which mode is to be retrieved from memory and applied in device operations.

Figure 14:
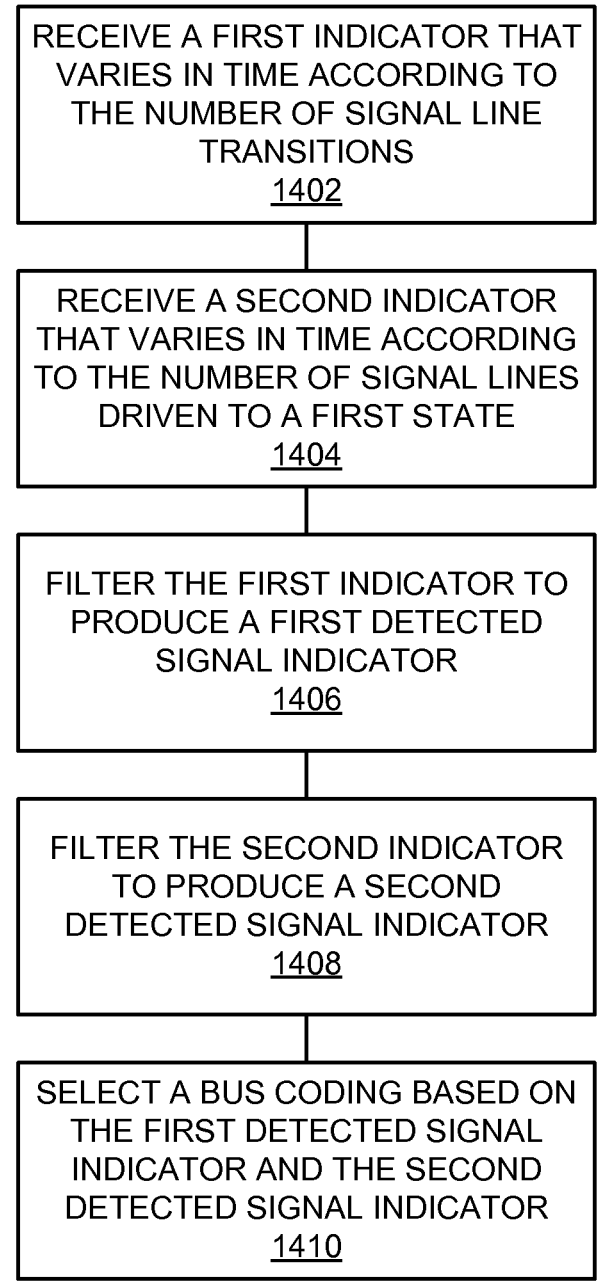

FIG. 14 is a flowchart illustrating a method of selecting an encoding for the signal lines of a bus. The steps illustrated in FIG. 14 may be performed by one or more elements of the systems and/or circuits described previously.

A first indicator that varies in time according to the number of signal line transitions is received (1402). For example, filter 268 may receive the output of summer 266 that indicates the sum of the number of signal lines that are transitioning. Because the data transmitted on the bus each unit interval may change, the sum of the number of signal lines that are (or will be) transitioning varies in time.

A second indicator that varies in time according to the number of signal lines driven to a first state is received (1404). For example, filter 218 may receive the output of summer 216 that indicates the sum of signals transmitted. Because the data transmitted on the bus each unit interval may change, the sum of signals transmitted varies in time.

The first indicator is filtered to produce a first detected signal indicator (1406). For example, filter 268 may filter the output of summer 266. This produces an output that detects the amount of signal in the output of summer 266 corresponding to the pass band(s) of filter 268.

The second indicator is filtered to produce a second detected signal indicator (1408). For example, filter 218 may filter the output of summer 216. This produces an output that detects the amount of signal in the output of summer 216 corresponding to the pass band(s) of filter 218.

A bus coding is selected based on the first detected signal indicator and the second detected signal indicator (1410). For example, the output of filters 268 and 218 may be summed. This sum may be compared to a threshold to determine whether to apply DBI encoding. In another example, the outputs of filters 268 and 218 may be individually compared to a pair of thresholds, respectively. The output of these two comparisons may then be used to determine an encoding to apply (e.g., DBI_AC or DBI_DC).

Figure 15:
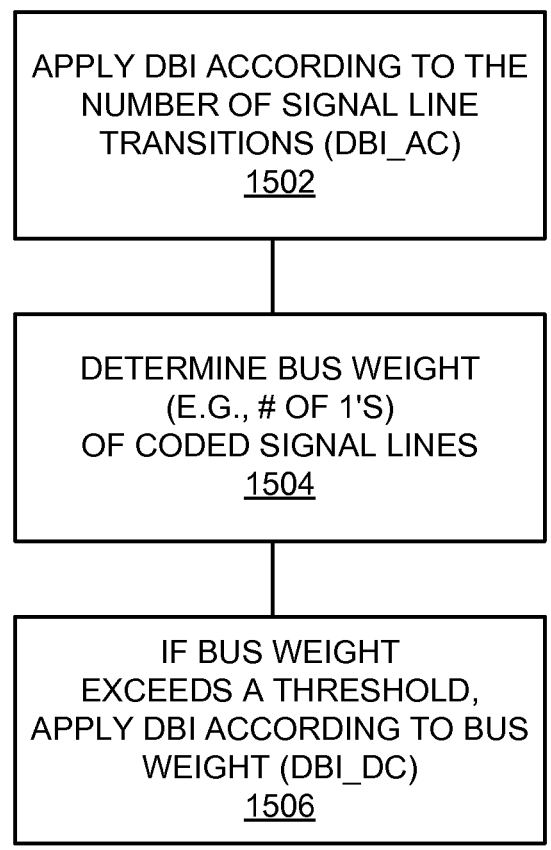
FIG. 15 is a flowchart illustrating a method of encoding the signal lines of a bus.

FIG. 15 is a flowchart illustrating a method of selecting an encoding for the signal lines of a bus. The steps illustrated in FIG. 15 may be performed by one or more elements of the systems and/or circuits described previously.

Data bus inversion is applied according to the number of signal line transitions (1502). In other words, DBI_AC encoding is applied. This may reduce high frequency noise. For example, detector 155 may control encoder 156 to apply DBI based on the number of signal line transitions.

The bus weight (e.g., number of "1s") of the coded signal lines is determined (1504). For example, detector 154 may determine the number of 1's or 0's to be transmitted on the bus. The number of 1's or 0's should be based on the encoding applied in block 1502.

If the bus weight exceeds a threshold, data bus inversion is applied according to the bus weight (1506). In other words, if the number of bits on the encoded signal lines is going to exceed a certain number (e.g., 6 of 8 bits), then DBI_DC is applied to determine the encoding. For example, detector 155 may "override" the encoding by detector 154 because the encoding selected by detector 154 will exceed a threshold number of bits being sent having a particular state.

In general, each of the circuits or elements of the data system as discussed herein may be realized on one or more integrated chips or one or more integrated circuits. The data system may be part of the integrated circuits of digital processing devices, computers, computer peripherals, graphics processing devices, etc. For example, the data system and/or detectors may be implemented with multiple integrated circuits where the bus implements communications between the distinct integrated circuits. These distinct integrated circuits may even be part of distinct components or modules of a system where the bus between the components or modules is used for transfer of data between the components. However, the data system may also be implemented on a single integrated chip and may be implemented for transmitting data between functional circuit blocks of the integrated chip. For example, the circuits may be implemented as part of a central processing unit or CPU as commonly employed in a digital computer or may be employed as an intermediary between the CPU and other circuit chips. Thus, circuits of the data system as discussed herein can be incorporated in the communication path between a processor such as a CPU and a cache memory. Thus, received data signals may be baseband data signals that are transmitted between circuit components thereof.

The bus technology may also be implemented as elements of point-to-point connections. By way of further example, the technology may also be implemented in high performance serial links (e.g., backplane links, PCI Gen3 lines, SATA Gen3/4, etc.) The technology can also be used with particular types of bus connections, (e.g., arrangements in which the same signal is sent to plural devices connected to the same conductors). The data system can even be implemented for parallel links such as parallel buses or any other device implementing parallel communications. The technology may be used in DDR, GDDR, RDRAM technologies and in parallel single-ended signaling interfaces. In other embodiments, the circuits may be an element of data input or output device controllers or the like, such as a memory controller and/or memory modules (e.g., dynamic random access memory and flash memory).

For example, in a memory controller embodiment, the memory controller generally acts as the device that sends data to the memory for a writing operation and receives data back from the memory for a reading operation. The bus of the data system 102 or 180 may be implemented to transmit signals sent from either or both of the memory and memory controller and may be realized in either or both of these devices with the remaining elements of the data system as discussed herein.

In general, each of the circuits implemented in the technology presented herein may be constructed with electrical elements such as traces, capacitors, resistors, transistors, etc. that are based on metal oxide semiconductor (MOS) technology, but may also be implemented using other technology such as bipolar technology or any other technology in which a signal-controlled current flow may be achieved.

Furthermore, these circuits of the data system 102 or data system 180 may be constructed using automated systems that fabricate integrated circuits. For example, the elements and systems described herein may be designed as one or more integrated circuits, or portions of an integrated circuit, based on design control instructions for doing so with circuit-forming apparatus that controls the fabrication of the elements or blocks of the integrated circuits. The instructions may be in the form of data stored in, for example, a computer-readable medium such as a magnetic tape or an optical or magnetic disk. The design control instructions typically encode data structures or other information or methods describing the circuitry or circuit elements that can be physically created as the elements of the integrated circuits. Although any appropriate format may be used for such encoding, such data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can then use such encoded data to fabricate integrated circuits comprising one or more of the circuits described herein.

In an embodiment, a device comprises an encoder to set an encoding scheme for transmitting signals on a plurality of signal lines of a bus and a detector to accept information representing frequency of signals on the bus, the detector to respond to the frequency. An output of the detector controls the encoder to selectively apply the encoding scheme as a function of the frequency. The detector may comprise a filter. The detector may be configured to change a setting of the encoder in response to a resonant frequency of a communication system power delivery network. The detector may be configured to change a setting of the encoder to filter a frequency detrimental to a power delivery network. The encoder circuit may include a bus inversion circuit. The detector may comprise a summer, a digital-to-analog converter, a low-pass filter and a comparator. The detector may be configured to accept information representing signals received from the bus and to accept information representing signals to be transmitted on the bus. The information representing the signals may be a Hamming weight of the signals and the detector configured to respond to frequency of a Hamming weight of the signals. The detector may be configured to detect frequency of the bus including during idle times of the bus.

The detector may comprise a summer, a filter and a comparator. This filter may be a bandpass filter, set with a bandpass characteristic at a resonant frequency of a power delivery network of the bus.

In a second embodiment of the device, the device may further comprise a memory controller wherein the memory controller is configured to control a read operation and a write operation on the plurality of signal lines, and wherein the plurality of signal lines includes at least one of an address bus, a control bus or a data bus, where the plurality is at least four bits wide. In a third embodiment of the device, the device may further include a serializer wherein parallel data is serialized for processing by the detector.

In an embodiment, a method for controlling a data bus comprises filtering data from signals of a plurality of signal lines of a bus to generate a coding control signal, the filtering responsive to at least a predetermined frequency, and controlling a coding scheme of a bus in response to the filtering. The method may further comprise transmitting signals on the plurality of signal lines of the bus according to the coding scheme. The bus may comprise a single ended parallel bus. The coding scheme may comprise bus inversion coding. The signals may represent information received from the bus and information to be transmitted on the bus. The signals may comprise Hamming weights and the controlling responds to frequency of the Hamming weights. The predetermined frequency may be a resonant frequency of a phase lock loop circuit or delay lock loop circuit involved in clocking of transmission of signals on the bus.

In a second embodiment of the method, the method may further comprise encoding data of a write operation in a memory controller with the controlled coding scheme of the bus. In a third embodiment of the method, the method may further comprise serializing parallel data for transmission on the bus and for the filtering.

In an embodiment, an integrated circuit for bus coding comprises a detector to sense a bus characteristic associated with transmission on a plurality of signal lines of a bus and to generate a control signal as a function of the bus characteristic; and, a bus encoder coupled with the detector to set data encoding of the plurality of signal lines of the bus. The bus encoder is set by the control signal.

In a second embodiment of the integrated circuit, the detector comprises a filter. The detector may be configured to accept information representing data received from the bus and to accept information representing data to be transmitted on the bus. The bus characteristic may be a plurality of Hamming weights and the detector configured to respond to frequency of the plurality of Hamming weights. The integrated circuit may further include a serializer wherein parallel data is serialized for processing by the detector.

In a third embodiment of the integrated circuit, the filter of the second embodiment of the integrated circuit may comprise a bandpass filter. In a fourth embodiment of the integrated circuit, the bus encoder of the third embodiment of the integrated circuit comprises a data bus inversion circuit. The detector may be configured to change a setting of the encoder in response to a frequency of the bus at or about a resonant frequency of a power delivery network. The detector may further comprise a summer and a comparator.

In a third embodiment of the integrated circuit, the second embodiment of the integrated circuit further comprises a memory controller. The memory controller is configured to control a read operation and a write operation on the plurality of signal lines.

In an embodiment, an information-bearing medium having computer-readable information thereon describes a block of an integrated circuit including a data bus encoder, the integrated circuit comprises a detector circuit, the detector circuit to couple with input signal values of a plurality of signal lines of a bus, the detector circuit to selectively respond to a frequency of signals on the plurality of signal lines of the bus, and a bus encoder circuit coupled to the detector circuit, the encoder circuit to set encoding of the signal lines of the bus under control of the detector circuit. The information may further define the detector circuit to include a spectral shaping filter circuit. The information may further define the bus encoder circuit to include a data bus inversion circuit. The detector circuit may be configured to accept information representing data received from the bus and to accept information representing data to be transmitted on the bus. The successive signal values may be Hamming weights and the detector circuit configured to respond to frequency of the Hamming weights.

In a second embodiment of the medium, the information further defines a memory controller wherein the memory controller is configured to control a read operation and a write operation on the plurality of signal lines. In a third embodiment of the medium, the information further defines a serializer circuit wherein parallel data is serialized for processing by the detector circuit.

In a fourth embodiment of the medium, the information further defines the detector circuit to include a filter circuit. The information of the fourth embodiment may further define the detector circuit to include a summer and a comparator.

In an embodiment, a system comprises detecting means for detecting signal frequency of a signaling bus, means for generating a control signal in response to a detection output of the detecting means, and encoding means coupled with the means for generating, the encoding means for selectively encoding data for transmission on the plurality of lines of the signaling bus in response to the control signal of the means for generating. The detecting means, the means for generating and the encoding means may comprise at last a portion of a memory component or a memory controller component. The detecting means, the means for generating and the encoding means may comprise at last a portion of a dynamic random access memory component. The detector means may be configured to accept information representing data received from the plurality of lines and to accept information representing data to be transmitted on the plurality of lines.

The system may further comprise a bus means for signaling data between transmitters and receivers of different integrated chips. Alternately, the system may further comprise a bus means for signaling data between transmitters and receivers of different integrated chips. Alternately, the system may further comprise a serializing means for serializing parallel data signals for processing by the detecting means.

In an embodiment, a method of encoding a bus comprises applying an encoding scheme to signals transmitted by a sender over the bus, monitoring frequency for at least some bus signals, and controlling encoding to dampen at least one frequency in bus signals. The bus may be a parallel bus having at least four parallel signal lines, and the encoding scheme selectively inverts each parallel line in the bus. The encoding scheme may include bus inversion. The monitoring may include bitwise summing of outputs of lines of a parallel bus and monitoring frequency of changes of the sum from successive signals transmitted over the bus. The at least one frequency may include a frequency exited by a resonant frequency of a phase lock loop circuit or delay lock loop circuit associated with timing of signals on the bus. The encoding scheme may be defined by programmable parameters stored on machine-readable media.

In a second embodiment of the method, the monitoring further includes monitoring of inbound and outbound signals, summing bit lines for each inbound signal and for each outbound signal, and monitoring frequency of change represented by successive sums from the inbound and outbound signals. In a third embodiment of the method, the monitoring further includes monitoring signals from plural busses, summing bit lines for at least each transmitted signal over each one of the plural busses, and monitoring frequency of change represented by successive signals irrespective of bus, and wherein the controlling includes controlling encoding in at least outbound signals on at least one of the plural busses. In a fourth embodiment of the method, the method further comprises determining at least one frequency characteristic associated with bus routing, and wherein the controlling includes comparing frequency of aggregate current of the bus with the at least one predetermined frequency characteristic and responsively adjusting frequency of encoding in response to the at least one frequency characteristic. The at least one frequency characteristic of the fourth embodiment may include a resonance frequency and adjusting includes controlling encoding in response to the resonance frequency. In a fifth embodiment, the method further comprises encoding the bus to implement one of plural preprogrammed encoding modes, wherein each encoding mode has an associated encoding scheme, and controlling encoding includes receiving a mode control signal and retrieving and applying the encoding scheme associated with a mode indicated by the mode control signal.

In the foregoing description and in the accompanying drawings, specific terminology and drawing symbols are set forth to provide a thorough understanding of the present technology. In some instances, the terminology and symbols may imply specific details that are not required to practice the technology. For example, although the terms "first" and "second" have been used herein, unless otherwise specified, the language is not intended to provide any specified order or count, but merely to assist in explaining elements of the technology.

Moreover, although the technology herein has been described with reference to particular embodiments, it is to be understood that these embodiments are merely illustrative of the principles and applications of the technology. It is therefore to be understood that numerous modifications may be made to the illustrative embodiments and that other arrangements may be devised without departing from the spirit and scope of the technology. For example, the detector of the present technology may monitor frequency information of multiple data busses for controlling encoding of data transmitted on one or more of the multiple data busses.

The invention claimed is:

1. A bus driving system, comprising:
   a first detector having a first detector output, the first detector receiving a first detector input signal that varies in time corresponding to transitions on a first plurality of signal lines;
   a second detector having a second detector output, the second detector receiving a second detector input signal that varies in time corresponding to signal line levels on a second plurality of signal lines; and,
   an encoder that selectively applies at least a first encoding scheme to a plurality of signal lines of a bus based on the first detector output and the second detector output.

2. The system of claim 1, wherein the second plurality of signal lines correspond to the plurality of signal lines of the bus.

3. The system of claim 1, wherein the first detector output varies in time corresponding to a first frequency characteristic of the transitions on the first plurality of signal lines.

4. The system of claim 3, wherein the second detector produces a second detector output that varies in time corresponding to a second frequency characteristic of the signal line levels on the second plurality of signal lines.

5. The system of claim 3, wherein the first encoding scheme is selectively applied based on a sum of a weighted first detector output and a weighted second detector output.

6. The system of claim 5, wherein the first detector output corresponds to a number of transitions on the first plurality of signal lines between a first and second set of data to be transmitted on the first plurality of signal lines, and the second detector output corresponds to a number of signal lines of a first level to be sent when the second set of data is sent.

7. The system of claim 1, wherein the encoder applies the first encoding scheme based on the first detector output and the second detector output overrides the first encoding scheme.

8. The system of claim 1, wherein a first power supply distribution network supplies a plurality of predrivers and a second power supply distribution network supplies a plurality of drivers of the signal lines of the bus, the plurality of predrivers controlling the plurality of drivers, the first detector output varying in time corresponding to an operating condition on the first power supply distribution network.

9. The system of claim 8, wherein the operating condition corresponds to a resonance on the first power supply distribution network.

10. The system of claim 1, wherein the at least the first encoding scheme comprises bus inversion.

11. The system of claim 1, wherein the bus driving system is included in a first integrated circuit, the transitions on the first plurality of signal lines and the signal line levels on the second plurality of signal lines are driven by the first integrated circuit and a second integrated circuit.

12. The system of claim 11, wherein the second integrated circuit applies a single encoding scheme to the plurality of signal lines of the bus.

13. The system of claim 1, wherein the first plurality of signal lines comprises a first bus and a second bus, the second plurality of signal lines comprises the first bus and the second bus, and the plurality of signal lines of the bus comprises the first bus.

14. The system of claim 13, wherein the at least first encoding scheme is applied to the first bus and not the second bus.

15. The system of claim 13, wherein the bus driving system is included in a first integrated circuit, the transitions on the first plurality of signal lines and the signal line levels on the second plurality of signal lines are driven by the first integrated circuit and a second integrated circuit, and, the at least first encoding scheme being applied to the plurality of signal lines of the bus by the first integrated circuit and not the second integrated circuit.

16. The system of claim 1, wherein the bus driving system is included in a memory controller integrated circuit.

17. The system of claim 1, wherein the bus driving system is included in a memory integrated circuit.

18. A method of encoding a plurality of signal lines of a bus, comprising:
   receiving, at a first detector, a first indicator, the first indicator varying in time corresponding to a first time varying number of signal line state transitions of the plurality of signal lines;
   receiving, at a second detector, a second indicator, the second indicator varying in time corresponding to a second time varying number of signal lines of the plurality of signal lines driven to a first state;
   filtering, by the first detector, the first indicator to produce a first detected signal indicator;
   filtering, by the second detector, the second indicator to produce a second detected signal indicator; and,
   selecting a first coding for the bus based on the first detected signal indicator and the second detected signal indicator.

19. The method of claim 18, wherein the first detected signal indicator is based on a first frequency characteristic of the first indicator.

20. The method of claim 18, further comprising:
   selecting a second coding for the bus based on the first detected signal indicator and the second detected signal indicator, wherein the first coding is data bus inversion coding and the second coding is non-inverted coding.

21. The method of claim 18, wherein the first detected signal indicator corresponds to a first correlation between the first indicator and a first frequency spectrum characteristic, the second detected signal indicator corresponds to a second correlation between the second indicator and a second frequency spectrum characteristic, and the first coding is selected based on a sum that includes a weighted first correlation and a weighted second correlation.

22. An integrated circuit, comprising:
   a first detector to sense a first characteristic associated with internal switching for a transmission on a plurality of signal lines on a bus, the first detector generating a first indicator associated with the first characteristic and the internal switching for the transmission;
   a second detector to sense a second characteristic associated with the transmission on the plurality of signal lines, the second detector generating a second indicator associated with the second characteristic and the transmission;
   an encoding controller to receive the first indicator and the second indicator, the encoding controller to select a selected encoding from at least a first encoding and a second encoding for the plurality of signal lines based on the first indicator and the second indicator; and,
   a bus encoder, responsive to the encoding controller, to set the selected encoding of the plurality of signal lines.

23. The integrated circuit of claim 22, wherein the first characteristic is associated with a resonant frequency of a power distribution network supplying power to the internal switching for the transmission on a plurality of signal lines.

24. The integrated circuit of claim 22, wherein the second characteristic is associated with a resonant frequency of a power distribution network supplying power to effect external signal states on the plurality of signal lines.

25. The integrated circuit of claim 22, wherein the first detector comprises a filter that passes a resonant frequency of a power distribution network supplying power to the internal switching for the transmission on a plurality of signal lines.

26. The integrated circuit of claim 22, wherein the second detector comprises a filter that passes a resonant frequency of a power distribution network supplying power to effect external signal states on the plurality of signal lines.

27. The integrated circuit of claim 23, wherein the encoding controller selects the selected encoding further based on an indicator of a number of signal transitions on said plurality of signal lines determined to occur within a predetermined time period.

28. The integrated circuit of claim 27, wherein the number of signal transitions on said plurality of signal lines includes signal transitions predicted to occur on the plurality of signal lines.

29. The integrated circuit of claim 22, wherein the first detector is configured to include information about a received transmission to sense the first characteristic.

30. The integrated circuit of claim 22, wherein the second detector is configured to include information about a received transmission to sense the second characteristic.

31. A non-transitory computer readable medium having information stored thereon that describes a block of an integrated circuit including a bus encoder, the integrated circuit comprising:
a first detector having a first detector output, the first detector receiving a first detector input signal that varies in time corresponding to transitions on a first plurality of signal lines;
a second detector having a second detector output, the second detector receiving a second detector input signal that varies in time corresponding to signal line levels on a second plurality of signal lines; and,
an encoder that selectively applies at least a first encoding scheme to a plurality of signal lines of a bus based on the first detector output and the second detector output.

32. The medium of claim 31, wherein a first power supply distribution network supplies a plurality of predrivers and a second power supply distribution network supplies a plurality of drivers of the signal lines of the bus, the plurality of predrivers controlling the plurality of drivers, the first detector output varying in time corresponding to an operating condition on the first power supply distribution network.

33. The medium of claim 32, wherein the operating condition corresponds to a resonance on the first power supply distribution network.

34. The medium of claim 31, wherein the at least the first encoding scheme comprises bus inversion.

35. A system comprising:
a predriver power supply, the predriver power supply having a predriver power supply distribution network resonance frequency;
a signal line power supply, the signal line power supply having a signal line power supply distribution network resonance frequency;
a plurality of signal line predrivers using the predriver power supply;
a plurality of signal line drivers setting signal levels on a plurality of signal lines, the plurality of signal line drivers controlled by the plurality of signal line predrivers and using the signal line power supply;
first detecting means for detecting a first frequency characteristic associated with the predriver power supply distribution network resonance frequency;
second detecting means for detecting a second frequency characteristic associated with the signal line driver power supply distribution network resonance frequency;
encoding selection means, coupled to the first detecting means and the second detecting means, for selecting at least a first encoding for the plurality of signal lines based on a first signal produced by the first detecting means and a second signal produced by the second detecting means; and,
encoding means coupled to the plurality of signal line predrivers for controlling the plurality of signal line predrivers to set the first encoding of the plurality of signal lines.

36. The system of claim 35, wherein the first encoding is data bus inversion and a second coding selected by the encoding selection means is non-inverted encoding.

37. The system of claim 35, wherein the first frequency characteristic includes a threshold signal power at the predriver power supply distribution network resonance frequency.

38. The system of claim 35, wherein the second frequency characteristic includes a threshold signal power at the signal line driver power supply distribution network resonance frequency.

39. The system of claim 35, wherein the first encoding is selected based on the relative magnitudes of the first signal produced by the first detecting means and the second signal produced by the second detecting means.

40. A system comprising:
a predriver power supply, the predriver power supply having a predriver power supply distribution network resonance frequency;
a signal line power supply, the signal line power supply having a signal line power supply distribution network resonance frequency;
a plurality of signal line predrivers using the predriver power supply;
a plurality of signal line drivers setting signal levels on a plurality of signal lines, the plurality of signal line drivers controlled by the plurality of signal line predrivers and using the signal line power supply;
a detector responsive to a first characteristic associated with the predriver power supply distribution network resonance frequency and a second characteristic associated with the signal line driver power supply distribution network resonance frequency;
an encoder, responsive to the detector, coupled to the plurality of signal line predrivers that controls the plurality of signal line predrivers to set a first encoding of the plurality of signal lines.

41. The system of claim 40, wherein the first encoding is data bus inversion and the encoder controls the plurality of signal line predrivers to set a second encoding of the plurality of signal lines that is non-inverted encoding.

42. The system of claim 40, wherein the first characteristic includes a threshold signal power corresponding to the predriver power supply distribution network resonance frequency.

43. The system of claim 40, wherein the first encoding is selected based on the relative magnitudes of a first signal power corresponding to the predriver power supply distribution network resonance frequency and a second signal power corresponding to the predriver power supply distribution network resonance frequency.

* * * * *